(12) United States Patent
MolavianJazi et al.

(10) Patent No.: US 10,986,593 B2
(45) Date of Patent: *Apr. 20, 2021

(54) UPLINK POWER CONTROL

(71) Applicant: Lenovo (Singapore) PTE. LTD., New Tech Park (SG)

(72) Inventors: Ebrahim MolavianJazi, Lincolnwood, IL (US); Vijay Nangia, Woodridge, IL (US); Hyejung Jung, Palatine, IL (US); Colin D. Frank, Park Ridge, IL (US); Robert T. Love, Barrington, IL (US); Ravi Kuchibhotla, Clarendon Hills, IL (US); Hossein Bagheri, Urbana, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,653

(22) Filed: May 18, 2020

(65) Prior Publication Data

US 2020/0280934 A1 Sep. 3, 2020

Related U.S. Application Data

(63) Continuation of application No. 16/150,222, filed on Oct. 2, 2018, now Pat. No. 10,660,048.

(Continued)

(51) Int. Cl.
*H04W 52/10* (2009.01)
*H04W 52/08* (2009.01)
(Continued)

(52) U.S. Cl.
CPC ........ *H04W 52/365* (2013.01); *H04B 7/0426* (2013.01); *H04B 7/0617* (2013.01);
(Continued)

(58) Field of Classification Search
CPC ... H04W 52/365; H04W 16/28; H04W 52/08; H04W 52/10; H04W 52/146;
(Continued)

(56) References Cited

U.S. PATENT DOCUMENTS 1,033,598 A 7/1912 Ledoux
5,812,947 A * 9/1998 Dent ..................... H01Q 1/246
455/103

(Continued)

FOREIGN PATENT DOCUMENTS

WO 2017146773 A1 8/2017
WO 2017165668 A1 9/2017
WO 2018210241 A1 11/2018

OTHER PUBLICATIONS

Ericsson, "Closed loop PC in NR", 3GPP TSG-RAN WG1 NR Ad Hoc #3, R1-1716606, Sep. 18-21, 2017, pp. 1-4.

(Continued)

*Primary Examiner* — Hai V Nguyen
(74) *Attorney, Agent, or Firm* — Kunzler Bean & Adamson

(57) ABSTRACT

Apparatuses, methods, and systems are disclosed for uplink power control. One method includes: receiving a message that configures a set of resources that each includes a downlink resource or an uplink sounding resource and is associated with an uplink transmission beam pattern; receiving scheduling information for an uplink transmission that is associated with a resource of the set of resources; determining an uplink transmission beam pattern associated with the resource; determining a configured maximum output power for the uplink transmission beam pattern that is based on an antenna array property associated with the uplink transmission beam pattern; determining a transmit power for the uplink transmission based on the configured maximum (Continued)

output power; and performing the uplink transmission using the uplink transmission beam pattern based on the transmit power.

19 Claims, 11 Drawing Sheets

Related U.S. Application Data

(60) Provisional application No. 62/567,133, filed on Oct. 2, 2017.

(51) Int. Cl.
| | | |
|---|---|---|
| *H04W 52/36* | (2009.01) | |
| *H04W 52/14* | (2009.01) | |
| *H04L 5/00* | (2006.01) | |
| *H04W 72/12* | (2009.01) | |
| *H04W 52/32* | (2009.01) | |
| *H04B 7/06* | (2006.01) | |
| *H04W 72/04* | (2009.01) | |
| *H04B 7/0426* | (2017.01) | |
| *H04W 52/24* | (2009.01) | |
| *H04B 7/08* | (2006.01) | |
| *H04W 16/28* | (2009.01) | |

(52) U.S. Cl.
CPC ......... *H04B 7/0626* (2013.01); *H04B 7/0695* (2013.01); *H04B 7/088* (2013.01); *H04L 5/0023* (2013.01); *H04L 5/0048* (2013.01); *H04L 5/0051* (2013.01); *H04W 16/28* (2013.01); *H04W 52/08* (2013.01); *H04W 52/10* (2013.01); *H04W 52/146* (2013.01); *H04W 52/242* (2013.01); *H04W 52/248* (2013.01); *H04W 52/325* (2013.01); *H04W 52/362* (2013.01); *H04W 52/367* (2013.01); *H04W 72/042* (2013.01); *H04W 72/046* (2013.01); *H04W 72/0473* (2013.01); *H04W 72/12* (2013.01); *H04W 72/121* (2013.01); *H04W 72/1268* (2013.01)

(58) Field of Classification Search
CPC ............. H04W 52/242; H04W 52/248; H04W 52/325; H04W 52/362; H04W 52/367; H04W 72/042; H04W 72/046; H04W 72/0473; H04W 72/12; H04W 72/121; H04W 72/1268; H04B 7/0426; H04B 7/0617; H04B 7/0626; H04B 7/0695; H04B 7/088; H04L 5/0023; H04L 5/0051
USPC .................................................. 455/522, 69
See application file for complete search history.

(56) References Cited

U.S. PATENT DOCUMENTS

| | | | | |
|---|---|---|---|---|
| 6,185,440 | B1* | 2/2001 | Barratt | H01Q 1/246 370/334 |
| 6,434,366 | B1* | 8/2002 | Harrison | H04B 7/0634 455/69 |
| 6,522,898 | B1* | 2/2003 | Kohno | H01Q 3/2605 342/383 |
| 6,694,155 | B1* | 2/2004 | Chin | H04B 7/0615 455/561 |
| 6,731,931 | B1* | 5/2004 | Grayson | H04B 7/18532 455/430 |
| 6,788,661 | B1* | 9/2004 | Ylitalo | H04B 7/0617 342/359 |
| 7,058,421 | B2* | 6/2006 | Ngai | H04W 52/30 455/12.1 |
| 7,062,294 | B1* | 6/2006 | Rogard | H04B 7/0615 342/367 |
| 7,072,693 | B2* | 7/2006 | Farlow | H04B 7/0691 370/334 |
| 7,299,071 | B1* | 11/2007 | Barratt | H01Q 1/246 455/277.1 |
| 7,647,071 | B2* | 1/2010 | Rofougaran | H04B 1/40 455/556.1 |
| 7,729,439 | B2* | 6/2010 | Zhang | H04B 7/0413 375/267 |
| 7,831,214 | B1* | 11/2010 | Stockmann | G01S 7/034 455/82 |
| 7,848,706 | B2* | 12/2010 | Vilzmann | H04W 74/0825 455/63.1 |
| 7,864,742 | B2* | 1/2011 | Bennett | H04W 88/04 370/338 |
| 8,280,445 | B2* | 10/2012 | Yong | H04B 7/0695 455/562.1 |
| 8,335,167 | B1* | 12/2012 | Zhang | H04B 7/0626 370/252 |
| 8,463,308 | B2* | 6/2013 | Matsuo | H04W 52/46 455/522 |
| 8,644,771 | B1* | 2/2014 | Delker | H04W 52/48 455/69 |
| 8,744,374 | B2* | 6/2014 | Aue | H04W 52/146 455/101 |
| 9,144,082 | B2* | 9/2015 | Rubin | H04B 7/18504 |
| 9,253,677 | B2* | 2/2016 | Siomina | H04W 24/10 |
| 9,680,988 | B2* | 6/2017 | Xia | H04M 3/26 |
| 9,820,250 | B2* | 11/2017 | Maltsev | H04B 3/36 |
| 9,942,814 | B1* | 4/2018 | Pawar | H04B 7/0617 |
| 10,187,835 | B2* | 1/2019 | Pawar | H04W 36/08 |
| 10,334,598 | B2* | 6/2019 | Loehr | H04W 72/1273 |
| 10,425,205 | B2* | 9/2019 | Hosseini | H04L 5/0051 |
| 10,440,671 | B2* | 10/2019 | Yamada | H04W 24/10 |
| 10,454,644 | B2* | 10/2019 | Manolakos | H04L 25/0224 |
| 2002/0058477 | A1* | 5/2002 | Chapelle | H04B 7/18508 455/13.4 |
| 2002/0058478 | A1* | 5/2002 | de La Chapelle | H04W 52/283 455/13.4 |
| 2003/0036404 | A1* | 2/2003 | Adachi | H04W 52/146 455/522 |
| 2003/0181163 | A1* | 9/2003 | Ofuji | H04W 16/28 455/25 |
| 2004/0014499 | A1* | 1/2004 | Hamalainen | G01S 3/14 455/561 |
| 2004/0072545 | A1* | 4/2004 | Hamalainen | H01Q 1/246 455/101 |
| 2004/0082308 | A1* | 4/2004 | Ngai | H04W 52/30 455/322 |
| 2006/0135079 | A1* | 6/2006 | Barnett | H04W 52/42 455/69 |
| 2009/0252251 | A1* | 10/2009 | Tosato | H04B 7/0639 375/267 |
| 2010/0330928 | A1* | 12/2010 | Prasad | H04B 7/0695 455/69 |
| 2011/0045785 | A1* | 2/2011 | Sutskover | H04B 7/0617 455/69 |
| 2011/0143807 | A1* | 6/2011 | Aue | H04B 7/0682 455/522 |
| 2013/0115886 | A1* | 5/2013 | Khan | H01Q 3/26 455/42 |
| 2013/0121195 | A1* | 5/2013 | Sundaresan | H04W 72/085 370/252 |
| 2013/0182683 | A1 | 7/2013 | Seol et al. | |
| 2013/0195025 | A1* | 8/2013 | Chatterjee | H04B 7/024 370/329 |
| 2013/0235807 | A1* | 9/2013 | Lee | H04W 72/12 370/329 |
| 2013/0303199 | A1* | 11/2013 | Siomina | H04L 5/0005 455/456.5 |
| 2013/0314280 | A1* | 11/2013 | Maltsev | H01Q 25/00 342/368 |
| 2013/0329543 | A1* | 12/2013 | Ogawa | H04L 5/0053 370/209 |

(56) References Cited

U.S. PATENT DOCUMENTS

| | | | | |
|---|---|---|---|---|
| 2014/0003270 | A1* | 1/2014 | Maltsev | H04B 7/0413 370/252 |
| 2014/0198761 | A1* | 7/2014 | Hooli | H04W 72/085 370/329 |
| 2014/0315594 | A1 | 10/2014 | Jeong et al. | |
| 2015/0146542 | A1* | 5/2015 | Xia | H04M 3/26 370/241.1 |
| 2015/0208262 | A1* | 7/2015 | Siomina | H04W 24/10 370/252 |
| 2015/0215077 | A1* | 7/2015 | Ratasuk | H04B 7/088 455/436 |
| 2016/0315680 | A1* | 10/2016 | Braun | H04B 7/0617 |
| 2017/0223694 | A1* | 8/2017 | Han | H04W 72/1284 |
| 2018/0026379 | A1* | 1/2018 | Barker | H01Q 21/065 343/844 |
| 2018/0048442 | A1* | 2/2018 | Sang | H04B 7/088 |
| 2018/0049137 | A1* | 2/2018 | Li | H04W 52/242 |
| 2018/0132197 | A1 | 5/2018 | Lin et al. | |
| 2018/0183552 | A1* | 6/2018 | Hosseini | H04L 5/0082 |
| 2018/0192443 | A1* | 7/2018 | Novlan | H04W 76/11 |
| 2018/0199252 | A1* | 7/2018 | Pawar | H04B 7/0617 |
| 2018/0206132 | A1* | 7/2018 | Guo | H04B 7/02 |
| 2018/0219600 | A1* | 8/2018 | Kim | H04B 7/0695 |
| 2018/0220448 | A1* | 8/2018 | Akkarakaran | H04W 16/28 |
| 2018/0227094 | A1* | 8/2018 | Liu | H04L 5/0094 |
| 2018/0227945 | A1* | 8/2018 | Akkarakaran | H04L 5/0051 |
| 2018/0278313 | A1* | 9/2018 | Kim | H04B 7/0626 |
| 2018/0278371 | A1* | 9/2018 | Chien | H04L 1/0009 |
| 2018/0278384 | A1* | 9/2018 | Manolakos | H04W 72/044 |
| 2018/0310308 | A1* | 10/2018 | Loehr | H04W 72/10 |
| 2018/0359646 | A1* | 12/2018 | Tomeba | H04B 7/086 |
| 2018/0367346 | A1* | 12/2018 | Chen | H04B 17/345 |
| 2019/0013854 | A1* | 1/2019 | Kim | H04W 72/0406 |
| 2019/0044639 | A1* | 2/2019 | Ouchi | H04L 5/001 |
| 2019/0045569 | A1* | 2/2019 | Abedini | H04W 72/0473 |
| 2019/0075526 | A1* | 3/2019 | Nagaraj | H04B 7/0408 |
| 2019/0081675 | A1* | 3/2019 | Jung | H04B 7/063 |
| 2019/0081740 | A1* | 3/2019 | Kaikkonen | H04W 72/0446 |
| 2019/0081753 | A1* | 3/2019 | Jung | H04B 7/063 |
| 2019/0082398 | A1* | 3/2019 | Loehr | H04W 72/14 |
| 2019/0082399 | A1* | 3/2019 | Loehr | H04W 52/365 |
| 2019/0098585 | A1* | 3/2019 | Golitschek Edler von Elbwart | H04W 52/58 |
| 2019/0098657 | A1* | 3/2019 | Golitschek Edler von Elbwart | H04W 72/1242 |
| 2019/0103949 | A1* | 4/2019 | Harrison | H04L 5/0091 |
| 2019/0104498 | A1* | 4/2019 | Jung | H04W 68/005 |
| 2019/0141643 | A1* | 5/2019 | MolavianJazi | H04W 52/08 |
| 2019/0149378 | A1* | 5/2019 | Takata | H04L 5/0048 370/280 |
| 2019/0182007 | A1* | 6/2019 | Liu | H04L 5/003 |
| 2019/0199412 | A1* | 6/2019 | Koskela | H04W 72/0446 |
| 2019/0229789 | A1* | 7/2019 | Zhang | H04B 7/0695 |
| 2019/0246388 | A1* | 8/2019 | Seo | H04W 72/046 |
| 2019/0306872 | A1* | 10/2019 | Paredes Cabrera | H04L 5/0082 |
| 2019/0319759 | A1* | 10/2019 | Harrison | H04B 7/0421 |
| 2019/0373559 | A1 | 12/2019 | Davydov et al. | |
| 2020/0068494 | A1 | 2/2020 | Wen et al. | |

OTHER PUBLICATIONS

Nokia, Nokia Shanghai Bell, "Discussion on NR power control framework", 3GPP TSG RAN WG1 Meeting NR#3, R1-1716127, Sep. 18-21, 2017, pp. 1-5.

LG Electronics, "Discussion on UL power control for NR", 3GGP TSG RAN WG1 Meeting NR#3, R1-1715902, Sep. 18-21, 2017, pp. 1-8.

Huawei, Hisilicon, "General considerations on power headroom calculation and reporting", 3GPP TSG RAN WG1 Meeting AH NR#3, R1-1715604, Sep. 18-21, 2017, pp. 1-4.

Vivo, "NR UL power control framework", 3GPP TSG RAN WG1 NR Ad Hoc #3, R1-1715651, Sep. 18-21, 2017, pp. 1-5.

ZTE, Sanechips, "On NR Power Control", 3GPP TSG RAN WG1 Meeting NR#3, R1-1715454, Sep. 18-21, 2017, pp. 1-8.

Samsung, "On UL Power Control", 3GPP TSG RAN WG1 Meeting NR#3, R1-1716040, Sep. 18-21, 2017, pp. 1-6.

Qualcomm Incorporated, "Power control for PHR for NR", 3GPP TSG RAN WG1 Meeting NR#3, R1-1716451, Sep. 18-21, 2017, pp. 1-5.

NTT Docomo, Inc. "Power control framework for PUSCH", 3GPP TSG RAN WG1 NR Ad-Hoc Meeting, R1-1716114, Sep. 18-21, 2017, pp. 1-4.

Ericsson, "Power headroom reporting in NR", 3GPP TSG-RAN WG1 NR Ad Hoc #3, R1-1716605, Sep. 18-21, 2017, pp. 1-4.

Samsung, "Power Control for Multi-Beam Operation", 3GPP TSG RAN WG1 Meeting #89 R1-1708068, May 15-19, 2017, pp. 1-4.

Intel Corporation, "Details for UL Beam Management" 3GPP TSG-RAN WG1 Meeting #90 R1-1712551, Aug. 21-25, 2017, pp. 1-8.

Nokia et al., "Discussion on NR power control framework", 3GPP TSG RAN WG1 Meeting NR#3 R1-1716127, Sep. 18-21, 2017, pp. 1-5.

U.S. Appl. No. 16/150,233, "Office Action Summary", USPTO, dated Sep. 16, 2020, pp. 1-24.

U.S. Appl. No. 16/876,653, "Office Action Summary" dated Oct. 23, 2020 pp. 1-27.

\* cited by examiner

UPLINK POWER CONTROL

CROSS-REFERENCE TO RELATED APPLICATIONS

This application is a continuation application of U.S. patent application Ser. No. 16/150,222 filed on Oct. 2, 2018, which claims priority to U.S. Patent Application Ser. No. 62/567,133 entitled "UPLINK POWER CONTROL FOR MULTI-BEAM COMMUNICATIONS" and filed on Oct. 2, 2017 for Ebrahim MolavianJazi, all of which are incorporated herein by reference in their entirety.

FIELD

The subject matter disclosed herein relates generally to wireless communications and more particularly relates to uplink power control.

BACKGROUND

The following abbreviations are herewith defined, at least some of which are referred to within the following description: Third Generation Partnership Project ("3GPP"), $5^{th}$ Generation ("5G"), Positive-Acknowledgment ("ACK"), Angle of Arrival ("AoA"), Angle of Departure ("AoD"), Additional MPR ("A-MPR"), Access Point ("AP"), Binary Phase Shift Keying ("BPSK"), Buffer Status Report ("BSR"), Carrier Aggregation ("CA"), Clear Channel Assessment ("CCA"), Cyclic Delay Diversity ("CDD"), Code Division Multiple Access ("CDMA"), Control Element ("CE"), Closed-Loop ("CL"), Coordinated Multipoint ("CoMP"), Cyclic Prefix ("CP"), Cyclical Redundancy Check ("CRC"), Channel State Information ("CSI"), Common Search Space ("CSS"), Control Resource Set ("CORE-SET"), Discrete Fourier Transform Spread ("DFTS"), Downlink Control Information ("DCI"), Downlink ("DL"), Demodulation Reference Signal ("DMRS"), Downlink Pilot Time Slot ("DwPTS"), Enhanced Clear Channel Assessment ("eCCA"), Enhanced Mobile Broadband ("eMBB"), Evolved Node B ("eNB"), Effective Isotropic Radiated Power ("EIRP"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), General Packet Radio Services ("GPRS"), Guard Period ("GP"), Global System for Mobile Communications ("GSM"), Hybrid Automatic Repeat Request ("HARQ"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Long Term Evolution ("LTE"), Multiple Access ("MA"), Medium Access Control ("MAC"), Multimedia Broadcast Multicast Services ("MBMS"), Modulation Coding Scheme ("MCS"), Machine Type Communication ("MTC"), massive MTC ("mMTC"), Multiple Input Multiple Output ("MIMO"), Maximum Power Reduction ("MPR"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), New Radio ("NR"), Orthogonal Frequency Division Multiplexing ("OFDM"), Open-Loop ("OL"), Power Angular Spectrum ("PAS"), Power Control ("PC"), Primary Cell ("PCell"), Physical Broadcast Channel ("PBCH"), Physical Downlink Control Channel ("PDCCH"), Packet Data Convergence Protocol ("PDCP"), Physical Downlink Shared Channel ("PDSCH"), Pattern Division Multiple Access ("PDMA"), Physical Hybrid ARQ Indicator Channel ("PHICH"), Power Headroom ("PH"), Power Headroom Report ("PHR"), Physical Layer ("PHY"), Physical Random Access Channel ("PRACH"), Physical Resource Block ("PRB"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Radio Access Network ("RAN"), Radio Access Technology ("RAT"), Radio Resource Control ("RRC"), Random Access Procedure ("RACH"), Random Access Response ("RAR"), Radio Link Control ("RLC"), Radio Network Temporary Identifier ("RNTI"), Reference Signal ("RS"), Remaining Minimum System Information ("RMSI"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), Signal-to-Interference-Plus-Noise Ratio ("SINR"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX").

In certain wireless communications networks, multiple beams may be used for communication. In such networks, uplink power control may be complicated.

BRIEF SUMMARY

Methods for uplink power control are disclosed. Apparatuses and systems also perform the functions of the apparatus. One embodiment of a method includes receiving a first message that configures a set of reference signal resources. In such an embodiment, each reference signal resource of the set of reference signal resources includes a downlink reference signal resource or an uplink sounding reference signal resource, and each reference signal resource of the set of reference signal resources is associated with a corresponding uplink transmission beam pattern. In some embodiments, the method includes receiving scheduling information for a first uplink transmission. In such embodiments, the first uplink transmission is associated with a first reference signal resource of the set of reference signal resources. In certain embodiments, the method includes determining a first uplink transmission beam pattern associated with the first reference signal resource. In various embodiments, the method includes determining a first configured maximum output power for the first uplink transmission beam pattern. In such embodiments, the first configured maximum output power is based on a first antenna array property associated with the first uplink transmission beam pattern. In one embodiment, the method includes determining a first transmit power for the first uplink transmission based on the first configured maximum output power. In certain embodiments, the method includes performing the first uplink transmission using the first uplink transmission beam pattern based on the first transmit power.

One apparatus for uplink power control includes a receiver that: receives a first message that configures a set of reference signal resources, wherein each reference signal resource of the set of reference signal resources includes a downlink reference signal resource or an uplink sounding reference signal resource, and each reference signal resource of the set of reference signal resources is associated with a corresponding uplink transmission beam pattern; and receives scheduling information for a first uplink transmission. Moreover, in such an embodiment, the first uplink transmission is associated with a first reference signal resource of the set of reference signal resources. In certain embodiments, the apparatus includes a processor that: determines a first uplink transmission beam pattern associated with the first reference signal resource; determines a first configured maximum output power for the first uplink transmission beam pattern, wherein the first configured maximum output power is based on a first antenna array property associated with the first uplink transmission beam pattern; determines a first transmit power for the first uplink transmission based on the first configured maximum output power; and performs the first uplink transmission using the first uplink transmission beam pattern based on the first transmit power.

One method for uplink power control includes transmitting a first message that configures a set of reference signal resources. In such an embodiment, each reference signal resource of the set of reference signal resources includes a downlink reference signal resource or an uplink sounding reference signal resource, and each reference signal resource of the set of reference signal resources is associated with a corresponding uplink transmission beam pattern. In some embodiments, the method includes transmitting scheduling information for a first uplink transmission. In such embodiments, the first uplink transmission is associated with a first reference signal resource of the set of reference signal resources. Moreover, in such embodiments: a first uplink transmission beam pattern associated with the first reference signal resource is determined by a device; a first configured maximum output power for the first uplink transmission beam pattern is determined by the device, and the first configured maximum output power is based on a first antenna array property associated with the first uplink transmission beam pattern; and a first transmit power for the first uplink transmission is determined by the device based on the first configured maximum output power. In certain embodiments, the method includes receiving the first uplink transmission using the first uplink transmission beam pattern based on the first transmit power.

One apparatus for uplink power control includes a transmitter that: transmits a first message that configures a set of reference signal resources, wherein each reference signal resource of the set of reference signal resources includes a downlink reference signal resource or an uplink sounding reference signal resource, and each reference signal resource of the set of reference signal resources is associated with a corresponding uplink transmission beam pattern; and transmits scheduling information for a first uplink transmission, wherein the first uplink transmission is associated with a first reference signal resource of the set of reference signal resources. In such embodiments: a first uplink transmission beam pattern associated with the first reference signal resource is determined by a device; a first configured maximum output power for the first uplink transmission beam pattern is determined by the device, and the first configured maximum output power is based on a first antenna array property associated with the first uplink transmission beam pattern; and a first transmit power for the first uplink transmission is determined by the device based on the first configured maximum output power. In some embodiments, the apparatus includes a receiver that receives the first uplink transmission using the first uplink transmission beam pattern based on the first transmit power.

One method for transmit power control includes operating a network entity with multiple antenna arrays. In certain embodiments, the method includes determining a first closed-loop power control process for a first set of uplink beam patterns based on a first antenna array of the multiple antenna arrays. In such embodiments, at least one receive beam pattern of the first antenna array is used to receive a first uplink transmission using at least one uplink beam pattern of the first set of uplink beam patterns from a device. In some embodiments, the method includes determining a second closed-loop power control process for a second set of uplink beam patterns based on a second antenna array of the multiple antenna arrays. In such embodiments, at least one receive beam pattern of the second antenna array is used to receive a second uplink transmission using at least one beam pattern of the second set of uplink beam patterns from the device, and the second antenna array is different from the first antenna array. In various embodiments, the method includes indicating to the device in a configuration message the first closed-loop power control process and the second closed-loop power control process.

One apparatus for transmit power control includes a processor that: operates a network entity with multiple antenna arrays; determines a first closed-loop power control process for a first set of uplink beam patterns based on a first antenna array of the multiple antenna arrays, wherein at least one receive beam pattern of the first antenna array is used to receive a first uplink transmission using at least one uplink beam pattern of the first set of uplink beam patterns from a device; determines a second closed-loop power control process for a second set of uplink beam patterns based on a second antenna array of the multiple antenna arrays, wherein at least one receive beam pattern of the second antenna array is used to receive a second uplink transmission using at least one beam pattern of the second set of uplink beam patterns from the device, and the second antenna array is different from the first antenna array; and indicates to the device in a configuration message the first closed-loop power control process and the second closed-loop power control process.

One method for transmit power control includes receiving a configuration message indicating a first closed-loop power control process and a second closed-loop power control process from a network entity including multiple antenna arrays. In such an embodiment: the first closed-loop power control process is determined by the network entity for a first set of uplink beam patterns based on a first antenna array of the multiple antenna arrays, at least one receive beam pattern of the first antenna array is used to receive a first uplink transmission using at least one uplink beam pattern of the first set of uplink beam patterns from a device; and the second closed-loop power control process is determined by the network entity for a second set of uplink beam patterns based on a second antenna array of the multiple antenna arrays, at least one receive beam pattern of the second antenna array is used to receive a second uplink transmission using at least one beam pattern of the second set of uplink beam patterns from the device, and the second antenna array is different from the first antenna array.

One apparatus for transmit power control includes a receiver that: receives a configuration message indicating a first closed-loop power control process and a second closed-loop power control process from a network entity including multiple antenna arrays. In such an embodiment: the first closed-loop power control process is determined by the network entity for a first set of uplink beam patterns based on a first antenna array of the multiple antenna arrays, wherein at least one receive beam pattern of the first antenna array is used to receive a first uplink transmission using at least one uplink beam pattern of the first set of uplink beam patterns from a device; and the second closed-loop power control process is determined by the network entity for a second set of uplink beam patterns based on a second antenna array of the multiple antenna arrays, wherein at least one receive beam pattern of the second antenna array is used to receive a second uplink transmission using at least one beam pattern of the second set of uplink beam patterns from the device, and the second antenna array is different from the first antenna array.

One method for transmit power control includes determining a first receive beam pattern for a first uplink transmission beam pattern. In certain embodiments, the method includes determining a second receive beam pattern for a second uplink transmission beam pattern. In some embodiments, the method includes determining whether the first receive beam pattern is the same as the second receive beam pattern. In various embodiments, the method includes in response to determining that the first receive beam pattern is the same as the second receive beam, determining a power control parameter for the first uplink transmission beam pattern and the second uplink transmission beam pattern. In one embodiment, the method includes indicating to a device in a configuration message the power control parameter.

One apparatus for transmit power control includes a processor that: determines a first receive beam pattern for a first uplink transmission beam pattern; determines a second receive beam pattern for a second uplink transmission beam pattern; determines whether the first receive beam pattern is the same as the second receive beam pattern; in response to determining that the first receive beam pattern is the same as the second receive beam, determines a power control parameter for the first uplink transmission beam pattern and the second uplink transmission beam pattern; and indicates to a device in a configuration message the power control parameter.

One method for transmit power control includes receiving a configuration message including a power control parameter. In such an embodiment: a first receive beam pattern for a first uplink transmission beam pattern is determined by a network entity; a second receive beam pattern for a second uplink transmission beam pattern is determined by the network entity; the network entity determines whether the first receive beam pattern is the same as the second receive beam pattern; and in response to the network entity determining that the first receive beam pattern is the same as the second receive beam, the network entity determines a power control parameter for the first uplink transmission beam pattern and the second uplink transmission beam pattern.

One apparatus for transmit power control includes a receiver that: receives a configuration message including a power control parameter. In such an embodiment: a first receive beam pattern for a first uplink transmission beam pattern is determined by a network entity; a second receive beam pattern for a second uplink transmission beam pattern is determined by the network entity; the network entity determines whether the first receive beam pattern is the same as the second receive beam pattern; and in response to the network entity determining that the first receive beam pattern is the same as the second receive beam, the network entity determines a power control parameter for the first uplink transmission beam pattern and the second uplink transmission beam pattern.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
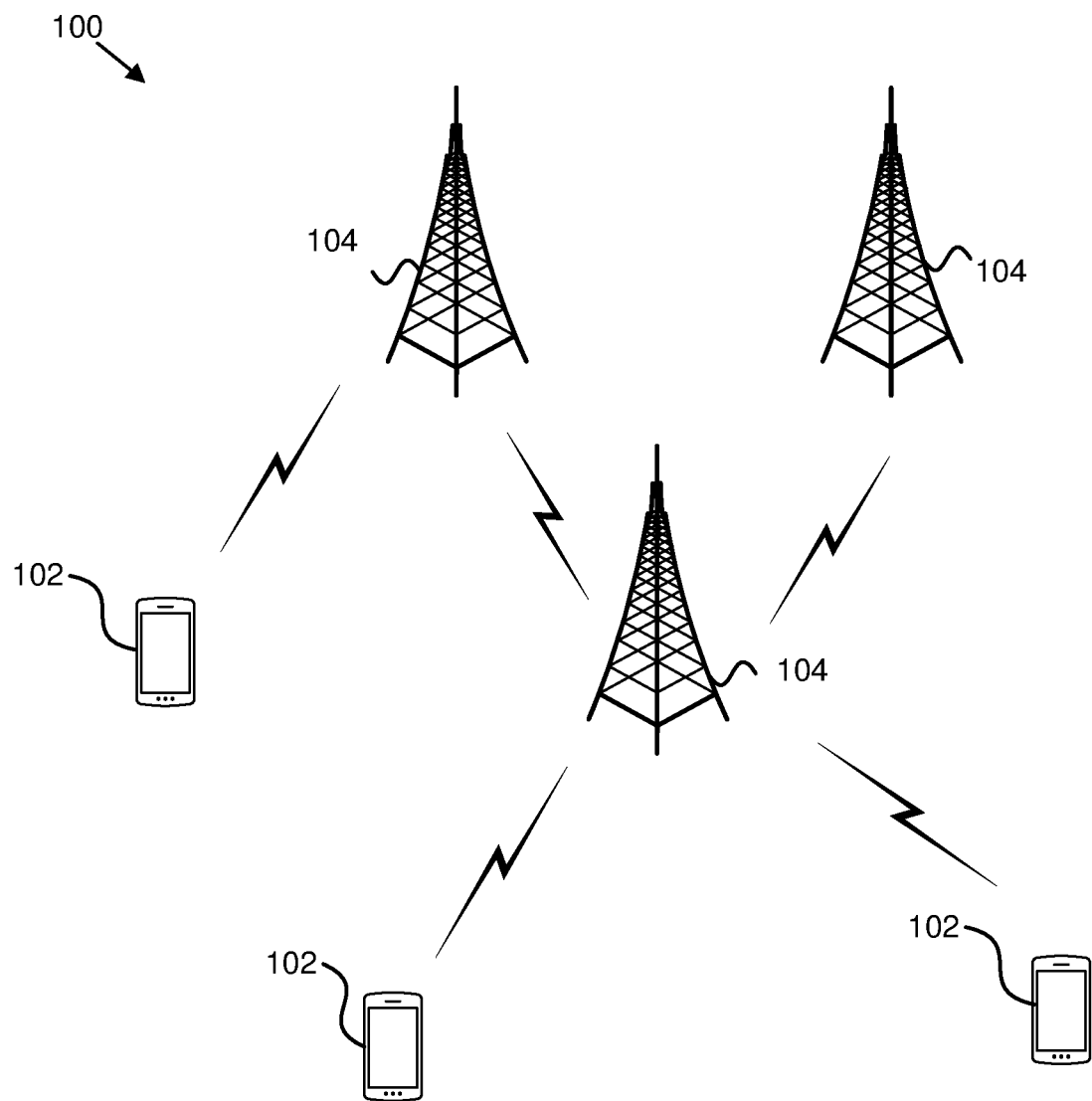
FIG. 1 is a schematic block diagram illustrating one embodiment of a wireless communication system for transmit power control.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmit power control. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may be used for transmit power control. The remote unit 102 may receive a first message that configures a set of reference signal resources. In such an embodiment, each reference signal resource of the set of reference signal resources includes a downlink reference signal resource or an uplink sounding reference signal resource, and each reference signal resource of the set of reference signal resources is associated with a corresponding uplink transmission beam pattern. In some embodiments, the remote unit 102 may receive scheduling information for a first uplink transmission. In such embodiments, the first uplink transmission is associated with a first reference signal resource of the set of reference signal resources. In certain embodiments, the remote unit 102 may determine a first uplink transmission beam pattern associated with the first reference signal resource. In various embodiments, the remote unit 102 may determine a first configured maximum output power for the first uplink transmission beam pattern. In such embodiments, the first configured maximum output power is based on a first antenna array property associated with the first uplink transmission beam pattern. In one embodiment, the remote unit 102 may determine a first transmit power for the first uplink transmission based on the first configured maximum output power. In certain embodiments, the remote unit 102 may perform the first uplink transmission using the first uplink transmission beam pattern based on the first transmit power. Accordingly, the remote unit 102 may be used for transmit power control.

In certain embodiments, a network unit 104 may be used for transmit power control. In some embodiments, the network unit 104 may transmit a first message that configures a set of reference signal resources. In such embodiments, each reference signal resource of the set of reference signal resources includes a downlink reference signal resource or an uplink sounding reference signal resource, and each reference signal resource of the set of reference signal resources is associated with a corresponding uplink transmission beam pattern. In some embodiments, the network unit 104 may transmit scheduling information for a first uplink transmission. In such embodiments, the first uplink transmission is associated with a first reference signal resource of the set of reference signal resources. Moreover, in such embodiments: a first uplink transmission beam pattern associated with the first reference signal resource is determined by a device; a first configured maximum output power for the first uplink transmission beam pattern is determined by the device, and the first configured maximum output power is based on a first antenna array property associated with the first uplink transmission beam pattern; and a first transmit power for the first uplink transmission is determined by the device based on the first configured maximum output power. In certain embodiments, the network unit 104 may receive the first uplink transmission using the first uplink transmission beam pattern based on the first transmit power. Accordingly, the network unit 104 may be used for transmit power control.

In certain embodiments, a network unit 104 may be used for transmit power control. In some embodiments, the network unit 104 may operate a network entity with multiple antenna arrays. In certain embodiments, the network unit 104 may determine a first closed-loop power control process for a first set of uplink beam patterns based on a first antenna array of the multiple antenna arrays. In such embodiments, at least one receive beam pattern of the first antenna array is used to receive a first uplink transmission using at least one uplink beam pattern of the first set of uplink beam patterns from a device. In some embodiments, the network unit 104 may determine a second closed-loop power control process for a second set of uplink beam patterns based on a second antenna array of the multiple antenna arrays. In such embodiments, at least one receive beam pattern of the second antenna array is used to receive a second uplink transmission using at least one beam pattern of the second set of uplink beam patterns from the device, and the second antenna array is different from the first antenna array. In various embodiments, the network unit 104 may indicate to the device in a configuration message the first closed-loop power control process and the second closed-loop power control process. Accordingly, the network unit 104 may be used for transmit power control.

In one embodiment, a remote unit 102 may be used for transmit power control. The remote unit 102 may receive a configuration message indicating a first closed-loop power control process and a second closed-loop power control process from a network entity including multiple antenna arrays. In such an embodiment: the first closed-loop power control process is determined by the network entity for a first set of uplink beam patterns based on a first antenna array of the multiple antenna arrays, at least one receive beam pattern of the first antenna array is used to receive a first uplink transmission using at least one uplink beam pattern of the first set of uplink beam patterns from a device; and the second closed-loop power control process is determined by the network entity for a second set of uplink beam patterns based on a second antenna array of the multiple antenna arrays, at least one receive beam pattern of the second antenna array is used to receive a second uplink transmission using at least one beam pattern of the second set of uplink beam patterns from the device, and the second antenna array is different from the first antenna array. Accordingly, the remote unit 102 may be used for transmit power control.

In certain embodiments, a network unit 104 may be used for transmit power control. In some embodiments, the network unit 104 may determine a first receive beam pattern for a first uplink transmission beam pattern. In certain embodiments, the network unit 104 may determine a second receive beam pattern for a second uplink transmission beam pattern. In some embodiments, the network unit 104 may determine whether the first receive beam pattern is the same as the second receive beam pattern. In various embodiments, the network unit 104 may, in response to determining that the first receive beam pattern is the same as the second receive beam, determine a power control parameter for the first uplink transmission beam pattern and the second uplink transmission beam pattern. In one embodiment, the network unit 104 may indicate to a device in a configuration message the power control parameter. Accordingly, the network unit 104 may be used for transmit power control.

In one embodiment, a remote unit 102 may be used for transmit power control. The remote unit 102 may receive a configuration message including a power control parameter. In such an embodiment: a first receive beam pattern for a first uplink transmission beam pattern is determined by a network entity; a second receive beam pattern for a second uplink transmission beam pattern is determined by the network entity; the network entity determines whether the first receive beam pattern is the same as the second receive beam pattern; and in response to the network entity determining that the first receive beam pattern is the same as the second receive beam, the network entity determines a power control parameter for the first uplink transmission beam pattern and the second uplink transmission beam pattern. Accordingly, the remote unit 102 may be used for transmit power control.

Figure 2:
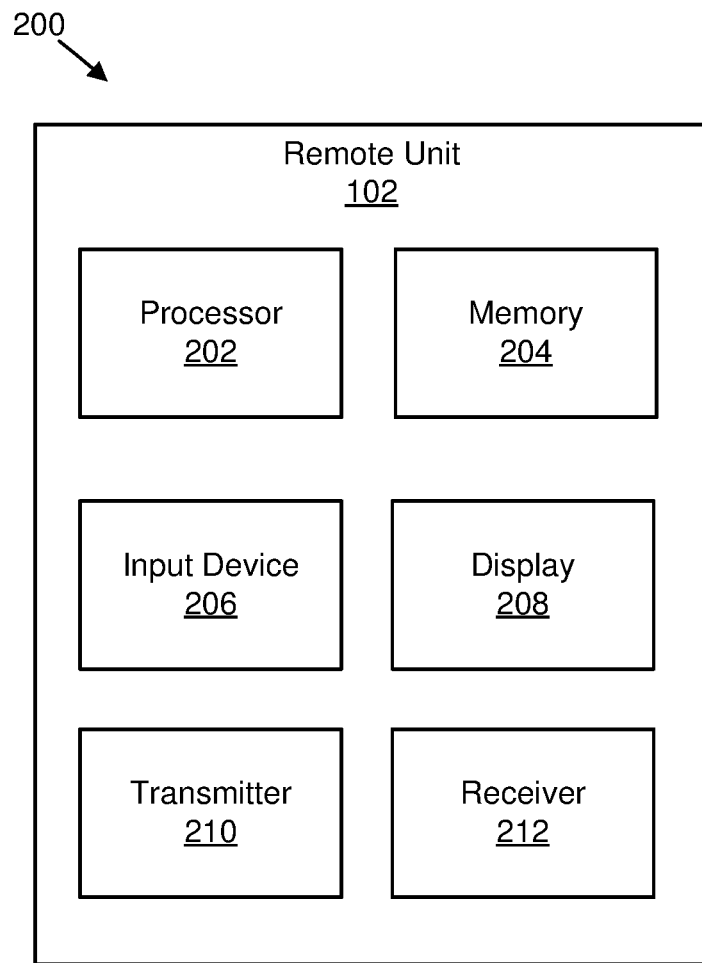
FIG. 2 is a schematic block diagram illustrating one embodiment of an apparatus that may be used for transmit power control.

FIG. 2 depicts one embodiment of an apparatus 200 that may be used for transmit power control. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: determine a first uplink transmission beam pattern associated with a first reference signal resource; determine a first configured maximum output power for the first uplink transmission beam pattern, wherein the first configured maximum output power is based on a first antenna array property associated with the first uplink transmission beam pattern; determine a first transmit power for the first uplink transmission based on the first configured maximum output power; and/or perform the first uplink transmission using the first uplink transmission beam pattern based on the first transmit power. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the receiver 212: receives a first message that configures a set of reference signal resources, wherein each reference signal resource of the set of reference signal resources includes a downlink reference signal resource or an uplink sounding reference signal resource, and each reference signal resource of the set of reference signal resources is associated with a corresponding uplink transmission beam pattern; and receives scheduling information for a first uplink transmission. Moreover, in such embodiments, the first uplink transmission is associated with a first reference signal resource of the set of reference signal resources.

In certain embodiments, the receiver 212: receives a configuration message indicating a first closed-loop power control process and a second closed-loop power control process from a network entity including multiple antenna arrays. In such embodiments: the first closed-loop power control process is determined by the network entity for a first set of uplink beam patterns based on a first antenna array of the multiple antenna arrays, wherein at least one receive beam pattern of the first antenna array is used to receive a first uplink transmission using at least one uplink beam pattern of the first set of uplink beam patterns from a device; and the second closed-loop power control process is determined by the network entity for a second set of uplink beam patterns based on a second antenna array of the multiple antenna arrays, wherein at least one receive beam pattern of the second antenna array is used to receive a second uplink transmission using at least one beam pattern of the second set of uplink beam patterns from the device, and the second antenna array is different from the first antenna array.

In various embodiments, the receiver 212: receives a configuration message including a power control parameter. In such embodiments: a first receive beam pattern for a first uplink transmission beam pattern is determined by a network entity; a second receive beam pattern for a second uplink transmission beam pattern is determined by the network entity; the network entity determines whether the first receive beam pattern is the same as the second receive beam pattern; and in response to the network entity determining that the first receive beam pattern is the same as the second receive beam, the network entity determines a power control parameter for the first uplink transmission beam pattern and the second uplink transmission beam pattern. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
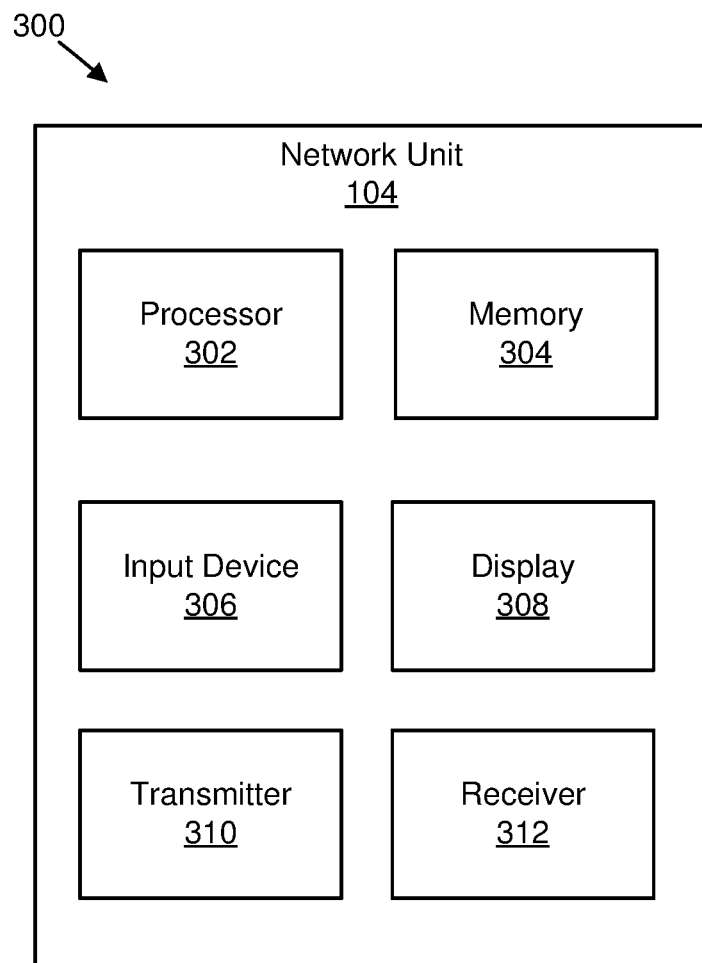
FIG. 3 is a schematic block diagram illustrating one embodiment of an apparatus that may be used for transmit power control.

FIG. 3 depicts one embodiment of an apparatus 300 that may be used for transmit power control. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: transmits a first message that configures a set of reference signal resources, wherein each reference signal resource of the set of reference signal resources includes a downlink reference signal resource or an uplink sounding reference signal resource, and each reference signal resource of the set of reference signal resources is associated with a corresponding uplink transmission beam pattern; and transmits scheduling information for a first uplink transmission, wherein the first uplink transmission is associated with a first reference signal resource of the set of reference signal resources. In such embodiments: a first uplink transmission beam pattern associated with the first reference signal resource is determined by a device; a first configured maximum output power for the first uplink transmission beam pattern is determined by the device, and the first configured maximum output power is based on a first antenna array property associated with the first uplink transmission beam pattern; and a first transmit power for the first uplink transmission is determined by the device based on the first configured maximum output power. In various embodiments, the receiver 312 receives the first uplink transmission using the first uplink transmission beam pattern based on the first transmit power.

In some embodiments, the processor 302: operates a network entity with multiple antenna arrays; determines a first closed-loop power control process for a first set of uplink beam patterns based on a first antenna array of the multiple antenna arrays, wherein at least one receive beam pattern of the first antenna array is used to receive a first uplink transmission using at least one uplink beam pattern of the first set of uplink beam patterns from a device; determines a second closed-loop power control process for a second set of uplink beam patterns based on a second antenna array of the multiple antenna arrays, wherein at least one receive beam pattern of the second antenna array is used to receive a second uplink transmission using at least one beam pattern of the second set of uplink beam patterns from the device, and the second antenna array is different from the first antenna array; and indicates to the device in a configuration message the first closed-loop power control process and the second closed-loop power control process.

In various embodiments, the processor 302: determines a first receive beam pattern for a first uplink transmission beam pattern; determines a second receive beam pattern for a second uplink transmission beam pattern; determines whether the first receive beam pattern is the same as the second receive beam pattern; in response to determining that the first receive beam pattern is the same as the second receive beam, determines a power control parameter for the first uplink transmission beam pattern and the second uplink transmission beam pattern; and indicates to a device in a configuration message the power control parameter. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, such as in 5G NR, a system may support both single beam and multi-beam based operations. In such embodiments, a UE may use a PC framework for UL signals and/or channels, such as PUSCH/PUCCH/PRACH/SRS/DMRS, to allocate appropriate power levels to those signals and/or channel for achieving a target SINR even with UL interference caused by other UEs at a gNB. As may be appreciated, each signal and/or channel may be carried on one or multiple beams that are separate from beams for other signals and/or channels or may be multiplexed on the same beams corresponding to one or some of the other signals and/or channels. For power control, a UE may be configured with one or more DL RS resources (e.g., CSI-RS, SS/PBCH block, etc.) that may be used for pathloss measurement and/or estimation to evaluate radio link qualities of one or more serving beams. In certain embodiments, an RS resource used for pathloss estimation may be referred to as a DL pathloss estimation RS resource. In such embodiments, each DL pathloss estimation RS resource may be associated with one or more DL antenna ports (e.g., an antenna port of a SS/PBCH block or a CSI-RS antenna port of a CSI-RS resource).

In various embodiments, an UL power control framework may include a static (or semi-static) OL part that sets a large-scale power level for a certain signal and/or channel of a UE, and a dynamic CL part that adjusts for small-scale time-varying power changes that may occur due to UL interference variations at a gNB. In some embodiments, OL-PC is based on a target power level P0, and a fractional pathloss compensation factor alpha, while the CL-PC is mainly based on a TPC command in an absolute or accumulated form across subframes, all of which may be configured by an eNB. In certain embodiments, to allocate frequency resources to a signal and/or channel by a gNB scheduler, a UE may transmit a PHR to an eNB. In various embodiments, a PHR may be defined as a gap between a current power level to a configured maximum UE output power called Pcmax.

Described herein are various methods that may be performed at a UE in a wireless network operated with multiple DL beams that may be transmitted using multiple gNB TRPS. Various methods may include computing: a UE's maximum transmission power level (e.g., $P_{CMAX}$) for multiple-panel UEs; a number of PHRs and their corresponding trigger conditions; and a configuration of CL-PC and its associated TPC command.

In certain configurations, for a serving cell and a given subframe only one $P_{CMAX}$ is defined for a UE because only single antenna panel and single-beam scenarios (e.g., omni antennas) are used.

For multi-panel and/or multi-beam wireless systems defined in 5G, one embodiment includes a UE reporting a separate PHR for all actively monitored gNB beams, including virtual PHR values with respect to a reference format (e.g., a specified number of PRB and/or MCS allocation) for gNB beams that are not currently scheduled for transmission and/or reception (namely, non-current beams). Another embodiment may include a UE not reporting any PHR values, because virtual reports for non-current beams may be considered to provide limited gain. In some embodiments, a UE may periodically report a network-configured number of virtual PHR values.

In various configurations, two trigger conditions may be used for reporting a new PHR report. One trigger condition may be based on expiration of a periodic-PHR timer, and a second trigger condition may be based on a significant change in a UE's DL pathloss estimation, provided enough time has elapsed after the previous PHR report, and based on expiration of a PHR-prohibit timer. In some embodiments, the same conditions as in LTE may be sufficient for a multi-beam 5G system. In certain embodiments, PHR may be triggered for any beam update. In one embodiment, a PHR trigger condition may reflect a sum of PL changes across all beam pair links, and the PHR itself may reflect the headroom to Pcmax of the sum of the individual power of all beam pair links.

In some configurations, such as a single-beam framework found in LTE, only a single CL-PC, and therefore a single TPC command, may be used. For other configurations, such as multi-beam 5G wireless systems, a single CL-PC may be sufficient (e.g., for single TRP, single panel, single beam transmission, and/or single beam reception). In certain embodiments, a single CL-PC may be set as default, and multiple CL-PC may be considered as optional for certain beam-specific scenario (e.g., for multi-TRP transmission and/or reception). In various embodiments, a separate accumulated TPC command may be used for each beam and to reset an accumulation once for all beam changes except for beam refinement. In some embodiments, a TPC accumulation may be reset in response to a change to a UE-specific part of P0 or a change to a beam-pair (e.g., a QCL beam-pair). In certain embodiments, one CL-PC may be used for each gNB TRP, but a configurable additional offset may be applied depending on a target service in response to a beam change or switch that occurs within the same TRP. In various embodiments, a common CL-PC within a QCL beam group may be used, and separate CL-PC for different QCL beam groups may be used.

Figure 4:
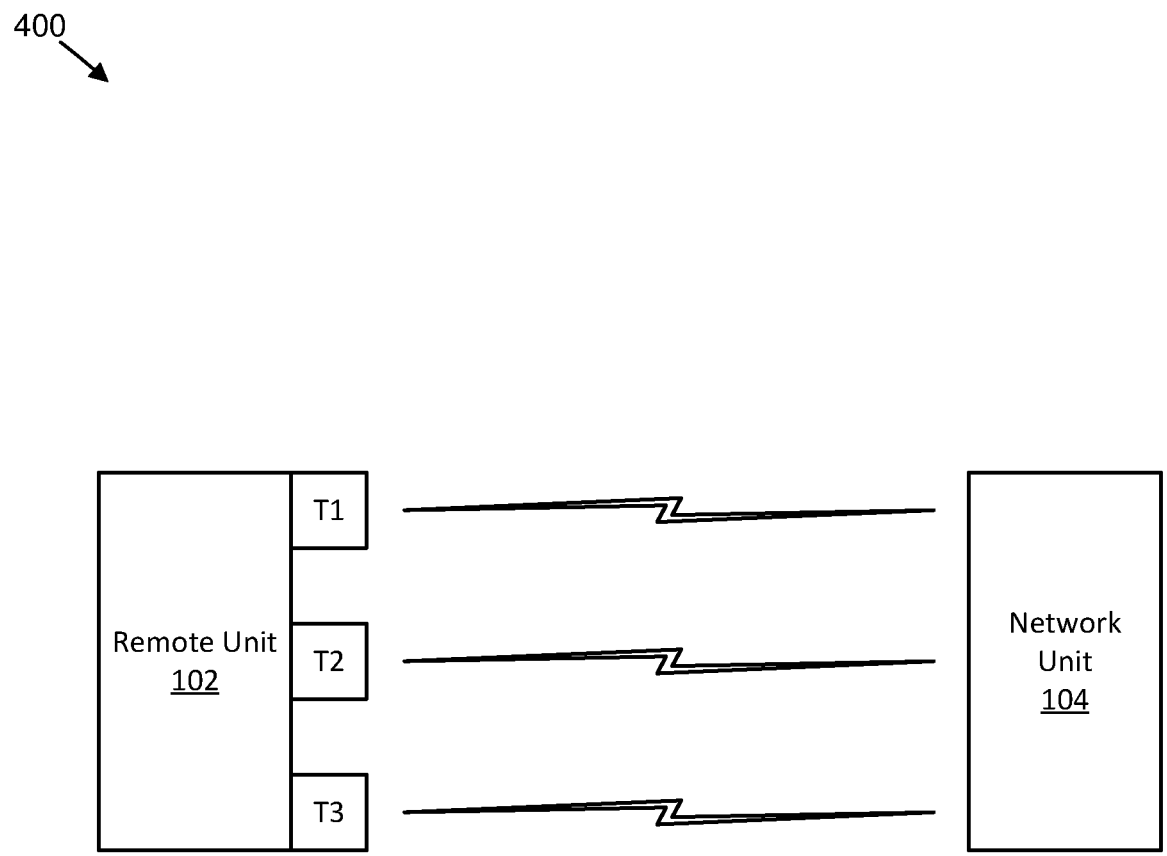
FIG. 4 is a schematic block diagram illustrating one embodiment of communication between a remote unit and a network unit.

In one embodiment, as illustrated in FIG. 4, for a given serving cell c, a UE (e.g., remote unit 102) may transmit to a gNB (e.g., a network unit 104) using multiple UE antenna panels and/or sub-arrays, each having a different number of antenna elements. At each time instance, each panel and/or sub-array may form one out of multiple possible beams for UL transmission to operate with a gNB beam (e.g., based on a DL beam management procedure). In some embodiments, a configured maximum output power value, called $P_{CMAX,b,c}$, for each UE beam may be a panel-dependent value defined in terms of a total radiated power or EIRP of the panel and/or sub-array, and may be UE antenna subarray-size/panel-size specific. In certain embodiments, $P_{CMAX,b,c}$ may depend upon a number of antenna elements within an antenna array, panel, and/or subarray that is transmitting. In one embodiment, if, for example in UL MIMO, UL CoMP, or UL Multi-TRP transmission, beams from two different UE antenna panel/subarray are used for simultaneous transmission to a gNB or multiple gNBs, an independent $P_{CMAX,b,c}$ setting may be used for beams from each UE antenna panel and/or subarray. In another embodiment, a single value of $P_{CMAX,b',c}$ may be used for both beams from two different UE antenna panels and/or subarrays such as the minimum or maximum of linear summation of the two $P_{CMAX,b,c}$ for the two beams from the two different UE antenna panels and/or subarrays, or e.g., the configured maximum output power for the serving cell $P_{CMAX,\ c}$. In various embodiments, power scaling may be performed if a total transmit power of a UE from two antenna panels and/or subarrays is to exceed a UE total configured maximum output power $P_{CMAX,\ c}$ or $P_{CMAX}$. In certain embodiments, $P_{CMAX,\ c}$ or $P_{CMAX}$ may depend on a UE power class and $P_{EMAX,c}$ configured for a serving cell. In some embodiments, a UE may report a beam, antenna array, panel, and/or subarray specific $P_{CMAX,b,c}$ value in response to a request from a network. In one embodiment, a UE may report a beam, antenna array, panel, subarray specific $P_{CMAX,b,c}$ that is used for calculating a PH for an UL transmission from the beam, antenna array, panel, and/or subarray together with the PH in a PHR from the UE. In some embodiments, the UL transmission may be a real transmission from the beam, antenna array, panel, and/or subarray, or the UL transmission may be a virtual transmission corresponding to a reference format. In some embodiments, a reference format may be a 1 RB allocation and $P_{CMAX,b,c}$ may be computed assuming: MPR=0 dB, A-MPR=0 dB, P-MPR=0 dB, and/or ATC=0 dB for a slot i. In certain embodiments, in response to a virtual PH being computed for a second beam (e.g., corresponding to a virtual transmission on the second beam with a reference format) together with a real PH for a first beam (e.g., with actual UL transmission on the first beam), the transmission scheme (e.g., CP-OFDM or SC-FDMA) for the virtual transmission may be assumed to be the same as the transmission scheme for the actual UL transmission on the first beam.

FIG. 4 is a schematic block diagram illustrating one embodiment of communication 400 between the remote unit 102 (e.g., a UE) and the network unit 104 (e.g., a gNB). As illustrated, the remote unit 102 includes a first transmission element T1, a second transmission element T2, and a third transmission element T3. Each of the first transmission element T1, the second transmission element T2, and the third transmission element T3 may transmit to the network unit 104. Moreover, each of the first transmission element T1, the second transmission element T2, and the third transmission element T3 may have a different number of antenna elements. In some embodiments, each of the first transmission element T1, the second transmission element T2, and the third transmission element T3 may be an antenna panel and/or an antenna sub-array.

In one embodiment, a UE may operate with the same gNB beams before and after a UE rotation event, during which the UE panel for the UL transmission, and therefore the corresponding UE UL beam, will change. In certain embodiments, if two UE panels before and after a UE rotation have a different number of antenna elements, corresponding $P_{CMAX,b,c}$ values may differ significantly. In embodiments in which there is a PH reporting either before or after a UE rotation, the UE may inform a gNB which $P_{CMAX,b,c}$ value has been used in the reported PH. In such embodiments, the reporting may avoid a misunderstanding between the gNB and the UE that a change in PH is due to $P_{CMAX}$ changes or due to other power setting differences (e.g., biased estimation of pathloss at the UE, etc.). This is, in some sense, similar to an extended PHR reporting in which a UE reports, in addition to a PH value, a corresponding $P_{CMAX,c}$ for a serving cell c, in response to real-PUSCH transmission existing for type-1 PH reporting or in response to real-PUCCH transmission existing for type-2 PH reporting.

In one embodiment, a UE may report an upper limit or upper bound of a configured maximum output power $P_{CMAX,b,c}$ for any UL beam associated with an antenna array, panel, and/or subarray, from which an UL transmission occurs together with a PH in a PHR from the UE. In such embodiments, the upper limit or upper bound of the configured maximum output power may depend on a UE antenna subarray-size, and/or a panel-size, and may depend on a number of antenna elements within the antenna array, panel, and/or subarray that is transmitting.

In certain embodiments, if a current beam is from a same antenna array, panel, and/or subarray as that used for computing a PH in a last PHR, then a UE may skip reporting a configured maximum output power in a current PHR. In such embodiments, the UE may indicate this by setting a value of a field in the PHR (e.g., C=0 if there is no change in a UE antenna array and configured maximum output power not included in the current PHR and C=1 if there is a change in the UE antenna array and configured maximum output power is included in the current PHR).

In one embodiment, in response to a UE being scheduled to transmit data (e.g., PUSCH or PUCCH) on 'K' beams corresponding to 'K' gNB beams (e.g., indicated in a transmission indicator in DCI, gNB beams used as DL pathloss reference, and may assume TX/RX beam correspondence) at a time in a slot i and a PHR is to be reported, then only a limited number of 1≤L≤K real PHs may be reported by the UE. The limited number of real PHs may be based on a similarity of gNB beams. For example, the similarity of gNB beams may be a spatial correlation. In certain embodiments, if a first set of gNB beams (e.g., two gNB beams) from a same gNB TRP (or TRP panel) are scheduled for a UE, the number of real PHs reported may be limited. In such embodiments, the first set of gNB beams may be QCL with respect to some large-scale parameters such as average delay and/or Doppler spread, therefore, only one PH may be reported for the first set of gNB beams. In one embodiment, one PH is reported for a first set of gNB beams regardless of whether corresponding UE transmit beams are operated with a same UE antenna panel and/or array or with distinct UE panels and/or arrays. In another embodiment, one PH is reported for a first set of gNB beams for which corresponding UE transmit beams are operated with a same UE antenna panel and/or array. In some embodiments, a single antenna array, panel, and/or subarray specific $P_{CMAX,b,c}$ that is used for calculating a PH for a first set of gNB beams may be included in a PHR.

In one embodiment, upon addition of gNB beams (e.g., that are not in an existing active beam set) to a set of active beams (e.g., monitored beams) for a UE, a PHR may be triggered and the UE may report virtual PH for the beams (e.g., the newly added gNB beams to the active beam set), along with a corresponding panel-specific $P_{CMAX,b,c}$ value or an indication of the panel/beam. In such embodiments, the network may be provided with an accurate estimate of a pathloss value for the newly added beams.

In one embodiment, in response to a UE being configured with 'N' gNB active beams and scheduled to transmit data (e.g., PUSCH or PUCCH) on 'K' beams corresponding to a subset of 'K' gNB beams at a time, where 1≤K≤N, then the UE may aperiodically report PHR with a virtual PH for a limited number of 0<L≤N−K gNB-selected non-current beams. In such embodiments, the aperiodic report may be based on an aperiodic trigger by the network. Moreover, the L selected non-current beams may be determined based on a dissimilarity of non-current beams with current beams and/or previous beam scheduling history and a possibility of scheduling a non-current gNB beam for transmission in upcoming sub-frames, for example.

In certain embodiments, UL transmissions may correspond to different TTI lengths (e.g., some UL transmissions may be slot based transmissions while other UL transmissions may be mini-slot based transmissions). In such embodiments, a PHR corresponding to each TTI length may be sent in an UL transmission corresponding to that TTI length (e.g., the UL transmission for a PHR may have a TTI length that matches the TTI length for the UL transmission).

In one embodiment, if a UE is capable of simultaneous transmission of multiple beams from multiple UE panels (e.g., one beam from each UE panel to each gNB TRP), the UE may report a PH separately for each beam with a corresponding $P_{CMAX,b,c}$ for that antenna array and/or panel, or may report a type-2-like PH with a single value of $P_{CMAX,b',c}$ that may be used for both beams, wherein the PH may be defined as a difference between $P_{CMAX,b',c}$ and a sum of a power required for an UL transmission of each beam from each panel. In some embodiments, a network may configure which corresponding gNB beams to use for simultaneous transmission of multiple beams from multiple UE panels. In various embodiments, a network may configure multiple type-2-like PHRs (e.g., based on a similarity of gNB beams), and for each PHR the network may configure a subset of active gNB beams (e.g., including non-current beams) that contribute to that PHR. For each PHR, the UE may also report applied $P_{CMAX,b,c}$ values for computing the PHR. If some of the gNB beams configured for a type-2-like PH are not currently scheduled for transmission and/or reception in a certain time slot (e.g., a single gNB/UE beam transmission at a time), a virtual type-2-like PH with respect to a reference format may be reported for the non-current beams, or for example a PH may be reported for only the scheduled beam.

In some embodiments, a step size for a TPC command (e.g., accumulated or absolute) may be different if different open-loop PC parameters (e.g., P0, alpha) may be configured to achieve different target SINR values (e.g., for different services, URLLC).

Figure 5:
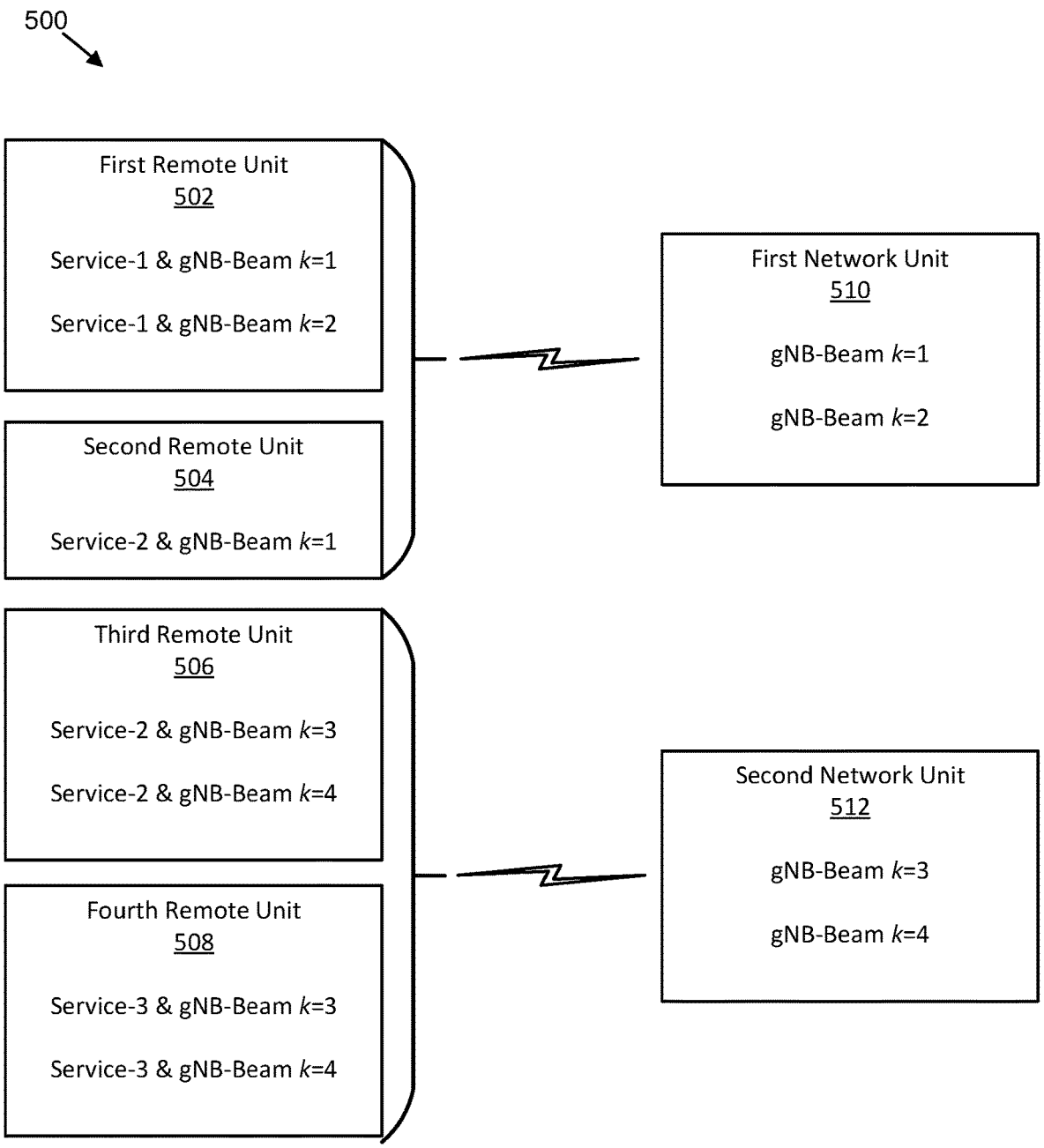
FIG. 5 is a schematic block diagram illustrating one embodiment of communication between multiple remote units and multiple network units.

In certain embodiments, a separate closed-loop power control (and a separate corresponding TPC command) may be configured for different panels of each gNB TRP if TRP panels are facing significantly different spatial directions, e.g., in terms of a geometrical (spherical) angle greater than a certain threshold possibly based on gNB implementation, or, e.g., in terms of the quasi-co-located ("QCL") information corresponding to different beams generated by the panels/TRPs of a gNB. In various embodiments, a same closed-loop PC may be used for all gNB Rx beams of a same TRP panel. In such embodiments, a last and/or current value of an accumulated TPC command may be carried over to a next time slot in response to one beam from those gNB beams being operated by the UE, even if those beams have not been used in a long time period, e.g., in terms of the absolute time duration (e.g., in micro-seconds) or the number of slots between two consecutive usages of beams from those gNB beams being greater than a certain threshold. FIG. 5 shows one embodiment of a way OL-PC and CL-PC may be linked for a multi-service, multi-beam 5G wireless system.

Specifically, FIG. 5 is a schematic block diagram illustrating one embodiment of communication 500 between multiple remote units (e.g., UEs, remote units 102) and multiple network units (e.g., gNBs, network units 104). Communication 500 between a first remote unit 502, a second remote unit 504, a third remote unit 506, a fourth remote unit 508, a first network unit 510, and a second network unit 512 are illustrated. The first remote unit 502 may have an OL-PC j=1. Moreover, the first remote unit 502 may operate a first service ("Service-1") and communicate with the first network unit 510 for the first service using a first beam ("gNB-Beam k=1") and a second beam ("gNB-Beam k=2"). The second remote unit 504 may have an OL-PC j=2. Moreover, the second remote unit 504 may operate a second service ("Service-2") and communicate with the first network unit 510 for the second service using the first beam.

The third remote unit 506 may have an OL-PC j=3. Moreover, the third remote unit 506 may operate the second service and communicate with the second network unit 512 for the second service using a third beam ("gNB-Beam k=3") and a fourth beam ("gNB-Beam k=4"). The fourth remote unit 508 may have an OL-PC j=4. Moreover, the fourth remote unit 508 may operate a third service ("Service-3") and communicate with the second network unit 512 for the third service using the third beam and the fourth beam.

The first network unit 510 may have a CL-PC l=1. Moreover, the first network unit 510 may communicate with the first remote unit 502 and the second remote unit 504 using the first beam and the second beam. The second network unit 512 may have a CL-PC l=2. Moreover, the second network unit 512 may communicate with the third remote unit 506 and the fourth remote unit 508 using the third beam and the fourth beam.

In one embodiment, for a fixed gNB RX beam, a same power control (e.g., open-loop and closed-loop) may be used irrespective of a UE TX beam selection and/or change, regardless of whether a UE beam change is within a same UE panel or across different UE panels, and whether or not the UE beam change is transparent to the gNB. In some embodiments, if a significant pathloss change occurs during a UE TX beam change for a fixed gNB Rx beam, a network may update a PRB allocation for that beam later (e.g., after a new PHR is reported), so that no other action is necessary on the UE side or gNB side.

In some embodiments, simultaneous (or concurrent) configuration of absolute and/or accumulated TPC command modes may be supported to reduce a number of closed-loop PC and/or to keep a step size for an accumulated TPC command small. In various embodiments, a value of an absolute TPC command may be TRP-specific or TRP-panel-specific (e.g., to capture a large-scale offset of different UL interferences observed by a gNB). In such embodiments, interference patterns across different TRP panels may be considered to be similar.

In various embodiments, TX/RX beam correspondence at a TRP and a UE may be considered as the following: 1) TX/RX beam correspondence at a TRP stays the same if at least one of the following is satisfied: a TRP is able to determine a TRP RX beam for an uplink reception based on a UE's downlink measurement on the TRP's one or more TX beams; and/or the TRP is able to determine a TRP TX beam for a downlink transmission based on the TRP's uplink measurement on the TRP's one or more RX beams; 2) TX/RX beam correspondence at a UE stays the same if at least one of the following is satisfied: a UE is able to determine a UE TX beam for an uplink transmission based on the UE's downlink measurement on the UE's one or more RX beams; and/or the UE is able to determine the UE RX beam for a downlink reception based on a TRP's indication based on an uplink measurement on the UE's one or more TX beams.

In one embodiment, a UE may receive a message configuring a first set of one or more DL RS resources (e.g., CSI-RS, SS/PBCH block beam), wherein each of the DL RS resource of the first set of DL RS resources is associated with a corresponding UL transmission beam pattern. In some embodiments, the UE may: receive a UL scheduling grant DCI on PDCCH indicating UL transmission, wherein the UL transmission associated with a first DL RS resource of the first set of DL RS resources; and determine a corresponding first UL transmission beam pattern associated with the indicated first DL RS resource. In various embodiments, the UE may measure on the indicated first DL RS resource on a first UE reception beam pattern and may determine the first UL transmission beam pattern based on the downlink measurement on the first UE reception beam pattern. In certain embodiments, the UE may also measure RSRP on the indicated first DL RS resource for pathloss estimation which may be used for UL transmit power determination. In some embodiments, the UE may determine a first configured maximum output power (e.g., $P_{CMAX,b,c}$ (i)) for the determined first UL transmission beam pattern wherein the first configured maximum output power for the determined first UL transmission beam pattern is based on an first antenna array and/or panel associated with the first UL transmission beam pattern. In various embodiments, the UE may: determine the first transmit power of the first UL transmission based on the determined first configured maximum output power and the pathloss estimate; and transmit an UL data corresponding to the UL scheduling grant using the determined first UL transmission beam pattern based on the determined first transmit power.

In another embodiment, a UE may receive a message configuring a first set of one or more DL RS resources (e.g., CSI-RS, SS/PBCH block beam) and/or UL sounding RS resources pairs, each of the DL RS resources and/or UL sounding RS resources of the first set of DL RS resources and/or UL sounding RS resources pairs may be associated with a corresponding UL transmission beam pattern. In some embodiments, the UE may receive an UL scheduling grant DCI on PDCCH indicating UL transmission, the UL transmission associated with a first DL RS resource and/or UL sounding RS resource of the first set of DL RS resource-pairs and/or UL sounding RS resource-pairs. In certain embodiments, the UE may measure RSRP on the indicated first DL RS resource for pathloss estimation which may be used for UL transmit power determination. In various embodiments, the UE may determine a corresponding first UL transmission beam pattern associated with the indicated first UL sounding RS resource. In some embodiments, the UE may determine a first configured maximum output power (e.g., $P_{CMAX,b,c}$ (i)) for the determined first UL transmission beam pattern wherein the first configured maximum output power for the determined first UL transmission beam pattern is based on an first antenna array and/or panel associated with the first UL transmission beam pattern. In some embodiments, the UE may: determine the first transmit power of the first UL transmission based on the determined first configured maximum output power and the pathloss estimate; and transmit a UL data corresponding to the UL scheduling grant using the determined first UL transmission beam pattern based on the determined first transmit power.

As used herein, an antenna port may be defined such that a channel over which a symbol on the antenna port is conveyed may be inferred from the channel over which another symbol on the same antenna port is conveyed.

Moreover, as used herein, two antenna ports may be considered QCL if large-scale properties of a channel over which a symbol on one antenna port is conveyed may be inferred from the channel over which a symbol on the other antenna port is conveyed. The large-scale properties may include delay spread, Doppler spread, Doppler shift, average gain, average delay, and/or spatial RX parameters. Two antenna ports may be QCL with respect to a subset of the large-scale properties. Spatial RX parameters may include: AoA, Dominant AoA, average AoA, angular spread, PAS of AoA, average AoD, PAS of AoD, transmit and/or receive channel correlation, transmit and/or receive beamforming, and/or spatial channel correlation.

In certain embodiments, an antenna port may be a logical port that may correspond to a beam (e.g., resulting from beamforming) or may correspond to a physical antenna on a device. In some embodiments, a physical antenna may map directly to a single antenna port, in which an antenna port corresponds to an actual physical antenna. In various embodiments, a set of physical antennas, a subset of physical antennas, an antenna set, an antenna array, and/or an antenna sub-array may be mapped to one or more antenna ports after applying complex weights, a cyclic delay, or both to the signal on each physical antenna. A physical antenna set may have antennas from a single module or panel, or from multiple modules or panels. The complex weights may be fixed as in an antenna virtualization scheme, such as CDD. A procedure used to derive antenna ports from physical antennas may be specific to a device implementation and transparent to other devices.

In some examples, DL TX antenna ports may correspond to antenna ports of a single CSI-RS resource, or antenna ports of different CSI-RS resources (e.g., a first subset (including one) of DL TX antenna ports corresponding to a first CSI-RS resource, and a second subset (including one) of DL TX antenna ports corresponding to a second CSI-RS resource).

In one example, an antenna port (e.g., DL TX) may be associated with one or more SS blocks, and each SS block may have a corresponding SS block index. An antenna port associated with a first SS block (e.g., with a first SS block index) may correspond to a first DL TX beam (e.g., beamforming pattern), and the antenna port associated with a second SS block (e.g., with a second SS block index) may correspond to a second DL TX beam. Thus, depending on the SS block, the antenna port may correspond to different DL TX beams (e.g., a first DL TX beam or a second DL TX beam). A first DL TX beam may be different than a second DL TX beam. A first SS block may be different than a second SS block which may result in a first SS block index being different than a second SS block index. In one example, a first SS block may be transmitted at a first time instance and a second SS block may be transmitted at a second time instance. In another example, a first and second SS block transmission instances may overlap and, in some examples, may completely overlap. In one example, a UE may assume that any transmission instance of an SS block with a same SS block index is transmitted on a same antenna port. A UE may not assume a channel over which a first SS block with a first SS block index is conveyed can be inferred from the channel over a second SS block with a second SS block index (e.g., different than the first SS block index) is conveyed even if the first and second SS blocks are transmitted on the same antenna port.

In another example, an antenna port (e.g., DL TX) may be associated with one or more CSI-RS resources. An antenna port associated with a first CSI-RS resource (e.g., with a first CSI-RS resource index) may correspond to a first DL TX beam (e.g., beamforming pattern), and the antenna port associated with a second CSI-RS resource (e.g., with a second CSI-RS resource index) may correspond to a second DL TX beam. Thus, depending on a CSI-RS resource, an antenna port may correspond to different DL TX beams (e.g., a first DL TX beam or a second DL TX beam). A first DL TX beam may be different than a second DL TX beam. A first CSI-RS resource may be different than a second CSI-RS resource which may result in a first CSI-RS resource index being different than a second CSI-RS resource index. In one example, a first CSI-RS resource may be transmitted at a first time instance and a second CSI-RS resource may be transmitted at a second time instance. In another example, a first and second CSI-RS resource transmission instances may overlap and, in some examples, may completely overlap. In one example, a UE may assume that any transmission instance of a CSI-RS resource with a same CSI-RS resource index is transmitted on the same antenna port. A UE may not assume a channel over which a first CSI-RS resource with a first CSI-RS resource index is conveyed can be inferred from the channel over a second CSI-RS resource with a second CSI-RS resource index (e.g., different than the first CSI-RS resource index) is conveyed even if the first and second CSI-RS resources are transmitted on the same antenna port.

Figure 6:
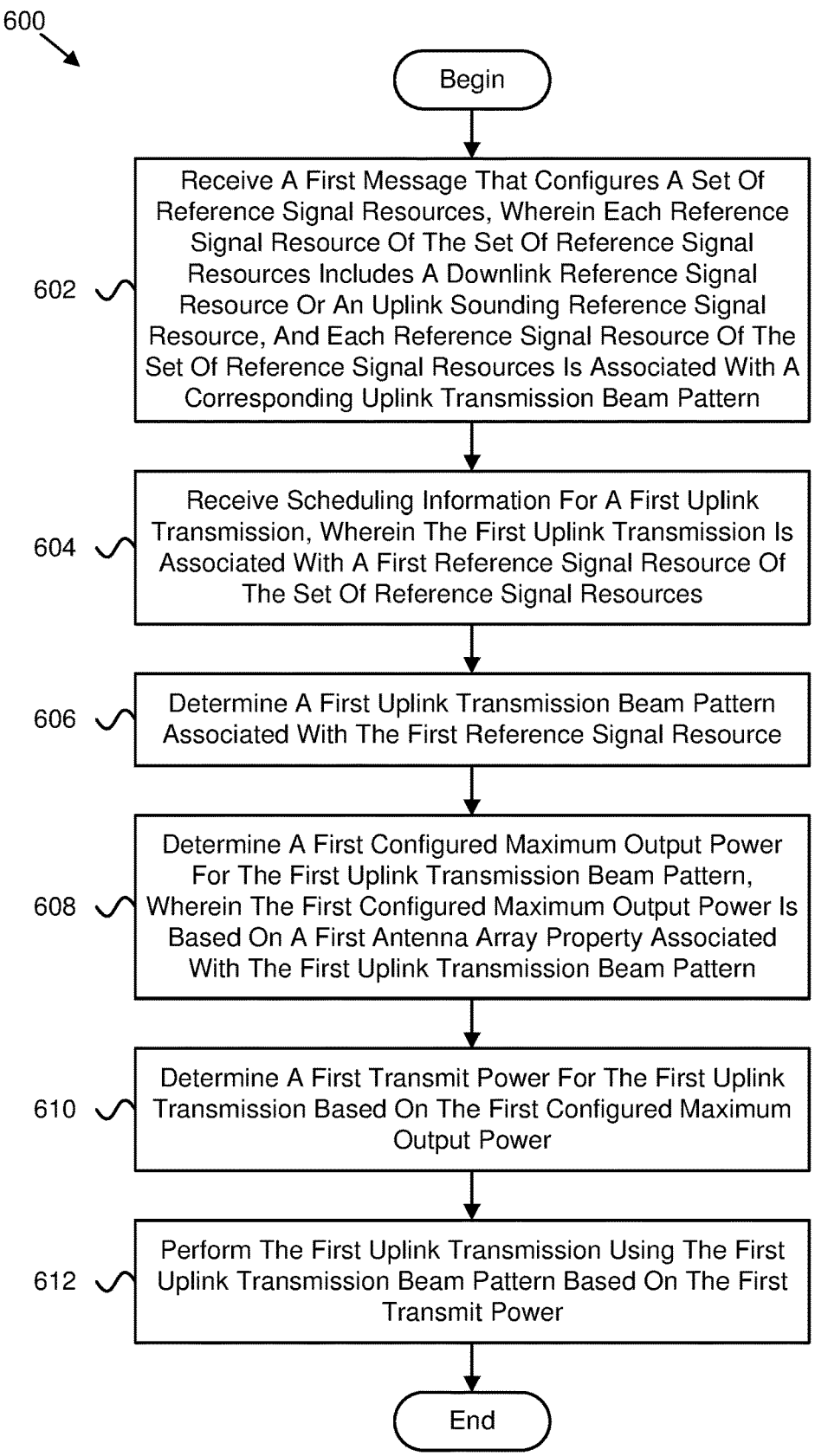
FIG. 6 is a flow chart diagram illustrating one embodiment of a method for transmit power control.

FIG. 6 is a flow chart diagram illustrating one embodiment of a method 600 for transmit power control. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include receiving 602 a first message that configures a set of reference signal resources. In such an embodiment, each reference signal resource of the set of reference signal resources includes a downlink reference signal resource or an uplink sounding reference signal resource, and each reference signal resource of the set of reference signal resources is associated with a corresponding uplink transmission beam pattern. In some embodiments, the method 600 includes receiving 604 scheduling information for a first uplink transmission. In such embodiments, the first uplink transmission is associated with a first reference signal resource of the set of reference signal resources. In certain embodiments, the method 600 includes determining 606 a first uplink transmission beam pattern associated with the first reference signal resource. In various embodiments, the method 600 includes determining 608 a first configured maximum output power for the first uplink transmission beam pattern. In such embodiments, the first configured maximum output power is based on a first antenna array property associated with the first uplink transmission beam pattern. In one embodiment, the method 600 includes determining 610 a first transmit power for the first uplink transmission based on the first configured maximum output power. In certain embodiments, the method 600 includes performing 612 the first uplink transmission using the first uplink transmission beam pattern based on the first transmit power.

In certain embodiments, the first reference signal resource spans a first set of frequency resources and a first set of orthogonal frequency division multiplexing symbols, and the set of reference signal resources comprises a second reference signal resource having a different number of orthogonal frequency division multiplexing symbols than the first reference signal resource. In some embodiments, the first antenna array property comprises a first number of antenna elements, and determining the first configured maximum output power for the first uplink transmission beam pattern is based on the first number of antenna elements. In various embodiments, the first number of antenna elements is for a first antenna array and the first uplink transmission beam pattern is associated with the first antenna array.

In one embodiment, the method 600 comprises: receiving information of a second uplink transmission, wherein the first and second uplink transmissions overlap in time and are for a serving cell, and the second uplink transmission is associated with a second reference signal resource of the set of reference signal resources; determining a second uplink transmission beam pattern associated with the second reference signal resource, wherein the second uplink transmission beam pattern is different from the first uplink transmission beam pattern; determining a second configured maximum output power for the second uplink transmission beam pattern in the serving cell; determining a second transmit power for the second uplink transmission based on the second configured maximum output power; and performing the second uplink transmission using the second uplink transmission beam pattern based on the second transmit power; wherein the first reference signal resource is from a first subset of the set of reference signal resources, the second reference signal resource is from a second subset of the set of reference signal resources, and the first subset and the second subset are mutually exclusive.

In certain embodiments, the first subset is associated with a first set of similar beams and the second subset is associated with a second set of similar beams. In some embodiments, the second configured maximum output power is the same as the first configured maximum output power, and the first uplink transmission beam pattern and the second uplink transmission beam pattern are from one antenna array. In various embodiments, the first uplink transmission beam pattern is from a first antenna array with the first antenna array property, the second uplink transmission beam pattern is from a second antenna array with a second antenna array property, the second configured maximum output power is the same as the first configured maximum output power, and the first configured maximum output power is further based on the second antenna array property.

In one embodiment, the method 600 comprises: determining a first intermediate configured maximum output power based on the first antenna array property, and a second intermediate configured maximum output power based on the second antenna array property; and determining the first configured maximum output power based on a selection from a group comprising: a minimum of the first intermediate configured maximum output power and the second intermediate configured maximum output power; a linear summation of the first intermediate configured maximum output power and the second intermediate configured maximum output power; and a maximum of the first intermediate configured maximum output power and the second configured intermediate maximum output power.

In certain embodiments, the method 600 comprises power scaling the first uplink transmission, dropping the first uplink transmission, power scaling the second uplink transmission, dropping the second uplink transmission, or some combination thereof if a linear summation of the first transmit power and the second transmit power exceeds a total configured maximum output power $P_{CMAX,c}$ for the serving cell, wherein $P_{CMAX,c}$ depends on a power class and a $P_{EMAX,\ c}$ configured for the serving cell. In some embodiments, the method 600 comprises including a power headroom report in the first uplink transmission, wherein the power headroom report comprises a first power headroom for the first uplink transmission and the first configured maximum output power.

In various embodiments, the first power headroom is a difference between the first configured maximum output power and a power required for the first uplink transmission, and the power required for the first uplink transmission is dependent on a number of physical resource blocks indicated in the scheduling information for the first uplink transmission. In one embodiment, the power headroom report corresponds to a first transmission time interval length associated with the first uplink transmission.

In certain embodiments, the method 600 comprises including a second power headroom in the first uplink transmission, wherein the second power headroom comprises a virtual power headroom, the virtual power headroom is a difference between a second configured maximum output power for a second uplink transmission beam pattern and a power required for a reference format uplink transmission using the second uplink transmission beam pattern, the second uplink transmission beam pattern is associated with a second reference signal resource of the set of reference signal resources, and the second reference signal resource is different from the first reference signal resource.

In some embodiments, the first uplink transmission is based on a first number of physical resource blocks indicated in the scheduling information, and the reference format uplink transmission is based on a predefined number of physical resource blocks. In various embodiments, the first power headroom and the second power headroom are included in the first uplink transmission in response to receiving an aperiodic trigger for reporting a virtual power headroom report. In one embodiment, the method 600 comprises reporting a first power headroom for the first uplink transmission and a second power headroom for the second uplink transmission.

In certain embodiments, the method 600 comprises reporting a power headroom for the first uplink transmission and the second uplink transmission. In some embodiments, the power headroom is based on a power required for the first uplink transmission and the first configured maximum output power. In various embodiments, the power headroom is a difference between: an aggregate configured maximum output power; and a linear summation of a first power required for the first uplink transmission and a second power required for the second uplink transmission.

In one embodiment, the aggregate configured maximum output power is selected from a group comprising: a minimum of the first configured maximum output power and the second configured maximum output power; a linear summation of the first configured maximum output power and the second configured maximum output power; and a maximum of the first configured maximum output power and the second configured maximum output power.

In certain embodiments, the method 600 comprises: determining a second uplink transmission beam pattern associated with a second reference signal resource, wherein the second reference signal resource is a predefined reference signal resource from the set of reference signal resources or an indicated reference signal resource from the set of reference signal resources, and the second reference signal resource is different from the first reference signal resource; determining a second configured maximum output power for the second uplink transmission beam pattern and a reference format uplink transmission, wherein the second configured maximum output power is based on a second antenna property associated with the second uplink transmission beam pattern, and the reference format uplink transmission is based on a predefined number of physical resource blocks; and including a power headroom in the first uplink transmission that is based on both the first uplink transmission and the second uplink transmission beam pattern; wherein the power headroom is a difference between: an aggregate configured maximum output power; and a linear summation of the power required for the first uplink transmission and a reference power required for the second uplink transmission beam pattern with respect to the reference format uplink transmission; and wherein the aggregate configured maximum output power is selected from a group comprising: a minimum of the first configured maximum output power and the second configured maximum output power; a linear summation of the first configured maximum output power and the second configured maximum output power; and a maximum of the first configured maximum output power and the second configured maximum output power.

In some embodiments, the first reference signal resource is a downlink reference signal resource and the method further comprises: measuring the downlink reference signal resource using a plurality of reception beam patterns; and determining the first uplink transmission beam pattern based on measurements resulting from measuring the downlink reference signal resource.

In various embodiments, the method 600 comprises: receiving a second message adding a second reference signal resource to the set of reference signal resources, wherein the second reference signal resource is different from the first reference signal resource; determining a second uplink transmission beam pattern associated with the second reference signal resource; determining a second configured maximum output power for the second uplink transmission beam pattern and a reference format, wherein the second configured maximum output power is based on a second antenna property associated with the second uplink transmission beam pattern; triggering a power headroom report for the second reference signal resource; and reporting the power headroom report in the first uplink transmission, wherein the power headroom report comprises a virtual power headroom based on a reference format uplink transmission for the second uplink transmission beam pattern and an indication of the second reference signal resource.

In one embodiment, the method 600 comprises: receiving a closed-loop transmission power control command in the scheduling information; determining a step size for the closed-loop transmission power control command based on an open-loop power control parameter set associated with the first downlink reference signal resource; and determining the first transmit power based on the first configured maximum output power, the closed-loop transmission power control command, and the step size. In certain embodiments, the step size is determined based on a transmission time interval length corresponding to the first uplink transmission. In some embodiments, the scheduling information comprises a transmission indicator that indicates that the uplink transmission is associated with the first reference signal resource.

Figure 7:
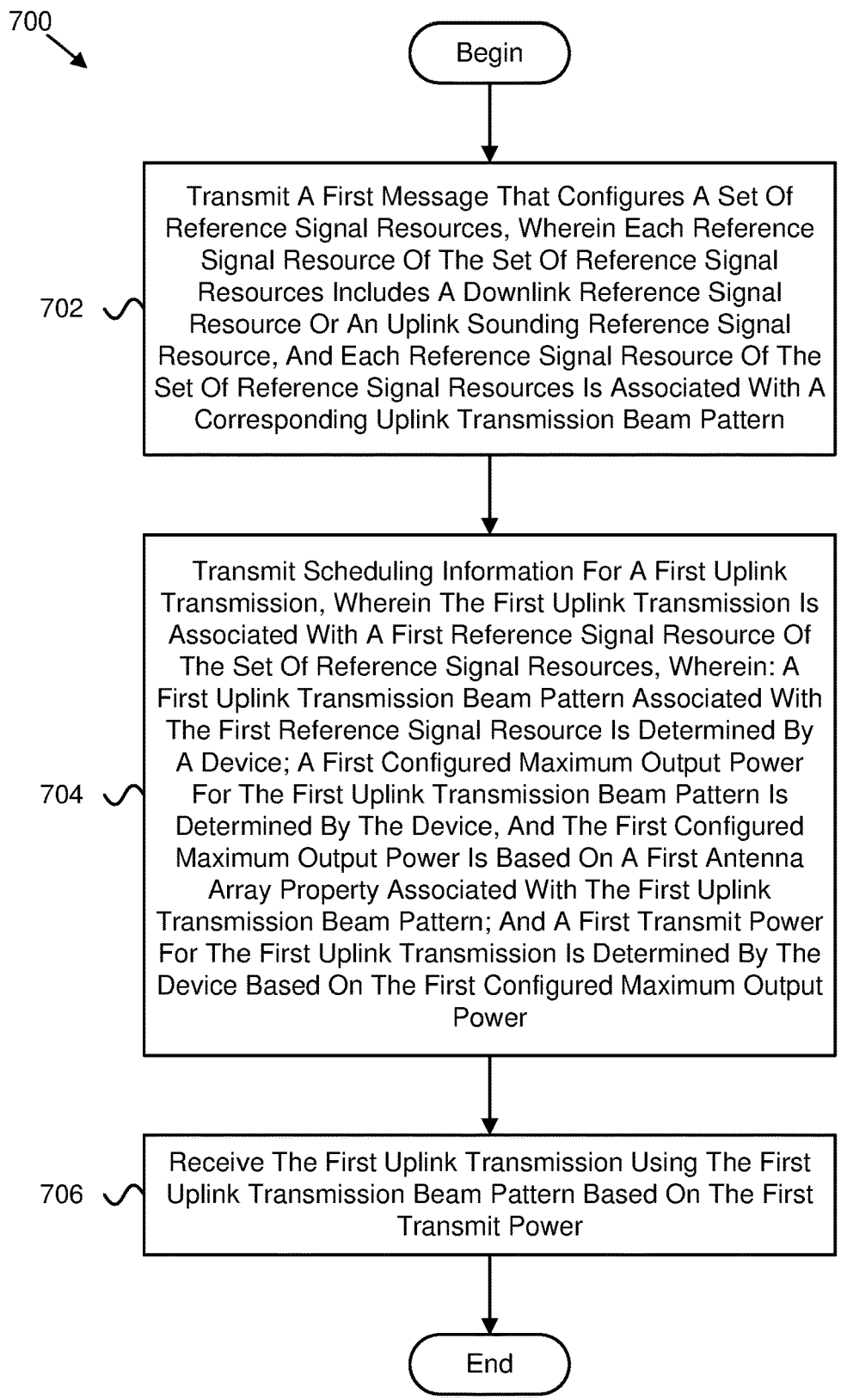
FIG. 7 is a flow chart diagram illustrating another embodiment of a method for transmit power control.

FIG. 7 is a flow chart diagram illustrating another embodiment of a method 700 for transmit power control. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

The method 700 may include transmitting 702 a first message that configures a set of reference signal resources. In such an embodiment, each reference signal resource of the set of reference signal resources includes a downlink reference signal resource or an uplink sounding reference signal resource, and each reference signal resource of the set of reference signal resources is associated with a corresponding uplink transmission beam pattern. In some embodiments, the method 700 includes transmitting 704 scheduling information for a first uplink transmission. In such embodiments, the first uplink transmission is associated with a first reference signal resource of the set of reference signal resources. Moreover, in such embodiments: a first uplink transmission beam pattern associated with the first reference signal resource is determined by a device; a first configured maximum output power for the first uplink transmission beam pattern is determined by the device, and the first configured maximum output power is based on a first antenna array property associated with the first uplink transmission beam pattern; and a first transmit power for the first uplink transmission is determined by the device based on the first configured maximum output power. In certain embodiments, the method 700 includes receiving 706 the first uplink transmission using the first uplink transmission beam pattern based on the first transmit power.

In certain embodiments, the first reference signal resource spans a first set of frequency resources and a first set of orthogonal frequency division multiplexing symbols, and the set of reference signal resources comprises a second reference signal resource having a different number of orthogonal frequency division multiplexing symbols than the first reference signal resource. In some embodiments, the first antenna array property comprises a first number of antenna elements, and determining the first configured maximum output power for the first uplink transmission beam pattern is based on the first number of antenna elements. In various embodiments, the first number of antenna elements is for a first antenna array and the first uplink transmission beam pattern is associated with the first antenna array.

In one embodiment, the method 700 comprises: transmitting information of a second uplink transmission, wherein the first and second uplink transmissions overlap in time and are for a serving cell, and the second uplink transmission is associated with a second reference signal resource of the set of reference signal resources, wherein: a second uplink transmission beam pattern associated with the second reference signal resource is determined by the device, and the second uplink transmission beam pattern is different from the first uplink transmission beam pattern; a second configured maximum output power for the second uplink transmission beam pattern in the serving cell is determined by the device; and a second transmit power for the second uplink transmission based on the second configured maximum output power is determined by the device; and receiving the second uplink transmission using the second uplink transmission beam pattern based on the second transmit power; wherein the first reference signal resource is from a first subset of the set of reference signal resources, the second reference signal resource is from a second subset of the set of reference signal resources, and the first subset and the second subset are mutually exclusive.

In certain embodiments, the first subset is associated with a first set of similar beams and the second subset is associated with a second set of similar beams. In some embodiments, the second configured maximum output power is the same as the first configured maximum output power, and the first uplink transmission beam pattern and the second uplink transmission beam pattern are from one antenna array. In various embodiments, the first uplink transmission beam pattern is from a first antenna array with the first antenna array property, the second uplink transmission beam pattern is from a second antenna array with a second antenna array property, the second configured maximum output power is the same as the first configured maximum output power, and the first configured maximum output power is further based on the second antenna array property.

In one embodiment, a first intermediate configured maximum output power based on the first antenna array property is determined by the device, and a second intermediate configured maximum output power based on the second antenna array property is determined by the device; and the first configured maximum output power is determined based on a selection from a group comprising: a minimum of the first intermediate configured maximum output power and the second intermediate configured maximum output power; a linear summation of the first intermediate configured maximum output power and the second intermediate configured maximum output power; and a maximum of the first intermediate configured maximum output power and the second configured intermediate maximum output power.

In certain embodiments, the device power scales the first uplink transmission, drops the first uplink transmission, power scales the second uplink transmission, drops the second uplink transmission, or some combination thereof if a linear summation of the first transmit power and the second transmit power exceeds a total configured maximum output power $P_{CMAX,c}$ for the serving cell, and $P_{CMAX,c}$ depends on a power class and a $P_{EMAX,\,c}$ configured for the serving cell. In some embodiments, a power headroom report is included in the first uplink transmission, and the power headroom report comprises a first power headroom for the first uplink transmission and the first configured maximum output power.

In various embodiments, the first power headroom is a difference between the first configured maximum output power and a power required for the first uplink transmission, and the power required for the first uplink transmission is dependent on a number of physical resource blocks indicated in the scheduling information for the first uplink transmission. In one embodiment, the power headroom report corresponds to a first transmission time interval length associated with the first uplink transmission.

In certain embodiments, a second power headroom is included in the first uplink transmission, the second power headroom comprises a virtual power headroom, the virtual power headroom is a difference between a second configured maximum output power for a second uplink transmission beam pattern and a power required for a reference format uplink transmission using the second uplink transmission beam pattern, the second uplink transmission beam pattern is associated with a second reference signal resource of the set of reference signal resources, and the second reference signal resource is different from the first reference signal resource.

In some embodiments, the first uplink transmission is based on a first number of physical resource blocks indicated in the scheduling information, and the reference format uplink transmission is based on a predefined number of physical resource blocks. In various embodiments, the first power headroom and the second power headroom are included in the first uplink transmission in response to receiving an aperiodic trigger for reporting a virtual power headroom report.

In one embodiment, the method 700 comprises receiving a first power headroom for the first uplink transmission and a second power headroom for the second uplink transmission. In certain embodiments, the method 700 comprises receiving a power headroom for the first uplink transmission and the second uplink transmission. In some embodiments, the power headroom is based on a power required for the first uplink transmission and the first configured maximum output power. In various embodiments, the power headroom is a difference between: an aggregate configured maximum output power; and a linear summation of a first power required for the first uplink transmission and a second power required for the second uplink transmission.

In one embodiment, the aggregate configured maximum output power is selected from a group comprising: a minimum of the first configured maximum output power and the second configured maximum output power; a linear summation of the first configured maximum output power and the second configured maximum output power; and a maximum of the first configured maximum output power and the second configured maximum output power.

In certain embodiments, a second uplink transmission beam pattern associated with a second reference signal resource is determined by the device, the second reference signal resource is a predefined reference signal resource from the set of reference signal resources or an indicated reference signal resource from the set of reference signal resources, and the second reference signal resource is different from the first reference signal resource; a second configured maximum output power for the second uplink transmission beam pattern and a reference format uplink transmission is determined by the device, the second configured maximum output power is based on a second antenna property associated with the second uplink transmission beam pattern, and the reference format uplink transmission is based on a predefined number of physical resource blocks; and a power headroom is included in the first uplink transmission that is based on both the first uplink transmission and the second uplink transmission beam pattern; wherein the power headroom is a difference between: an aggregate configured maximum output power; and a linear summation of the power required for the first uplink transmission and a reference power required for the second uplink transmission beam pattern with respect to the reference format uplink transmission; and wherein the aggregate configured maximum output power is selected from a group comprising: a minimum of the first configured maximum output power and the second configured maximum output power; a linear summation of the first configured maximum output power and the second configured maximum output power; and a maximum of the first configured maximum output power and the second configured maximum output power.

In some embodiments, the first reference signal resource is a downlink reference signal resource and wherein: the downlink reference signal resource is measured using a plurality of reception beam patterns; and the first uplink transmission beam pattern is determined based on measurements resulting from measuring the downlink reference signal resource.

In various embodiments, the method 700 comprises: transmitting a second message adding a second reference signal resource to the set of reference signal resources, wherein the second reference signal resource is different from the first reference signal resource, wherein: a second uplink transmission beam pattern associated with the second reference signal resource is determined by the device; a second configured maximum output power for the second uplink transmission beam pattern and a reference format is determined by the device, and the second configured maximum output power is based on a second antenna property associated with the second uplink transmission beam pattern; a power headroom report for the second reference signal resource is triggered by the device; and receiving the power headroom report in the first uplink transmission, wherein the power headroom report comprises a virtual power headroom based on a reference format uplink transmission for the second uplink transmission beam pattern and an indication of the second reference signal resource.

In one embodiment, the method 700 comprises: transmitting a closed-loop transmission power control command in the scheduling information, wherein: a step size for the closed-loop transmission power control command is determined based on an open-loop power control parameter set associated with the first downlink reference signal resource; and the first transmit power is determined based on the first configured maximum output power, the closed-loop transmission power control command, and the step size. In certain embodiments, the step size is determined based on a transmission time interval length corresponding to the first uplink transmission. In some embodiments, the scheduling information comprises a transmission indicator that indicates that the uplink transmission is associated with the first reference signal resource.

Figure 8:
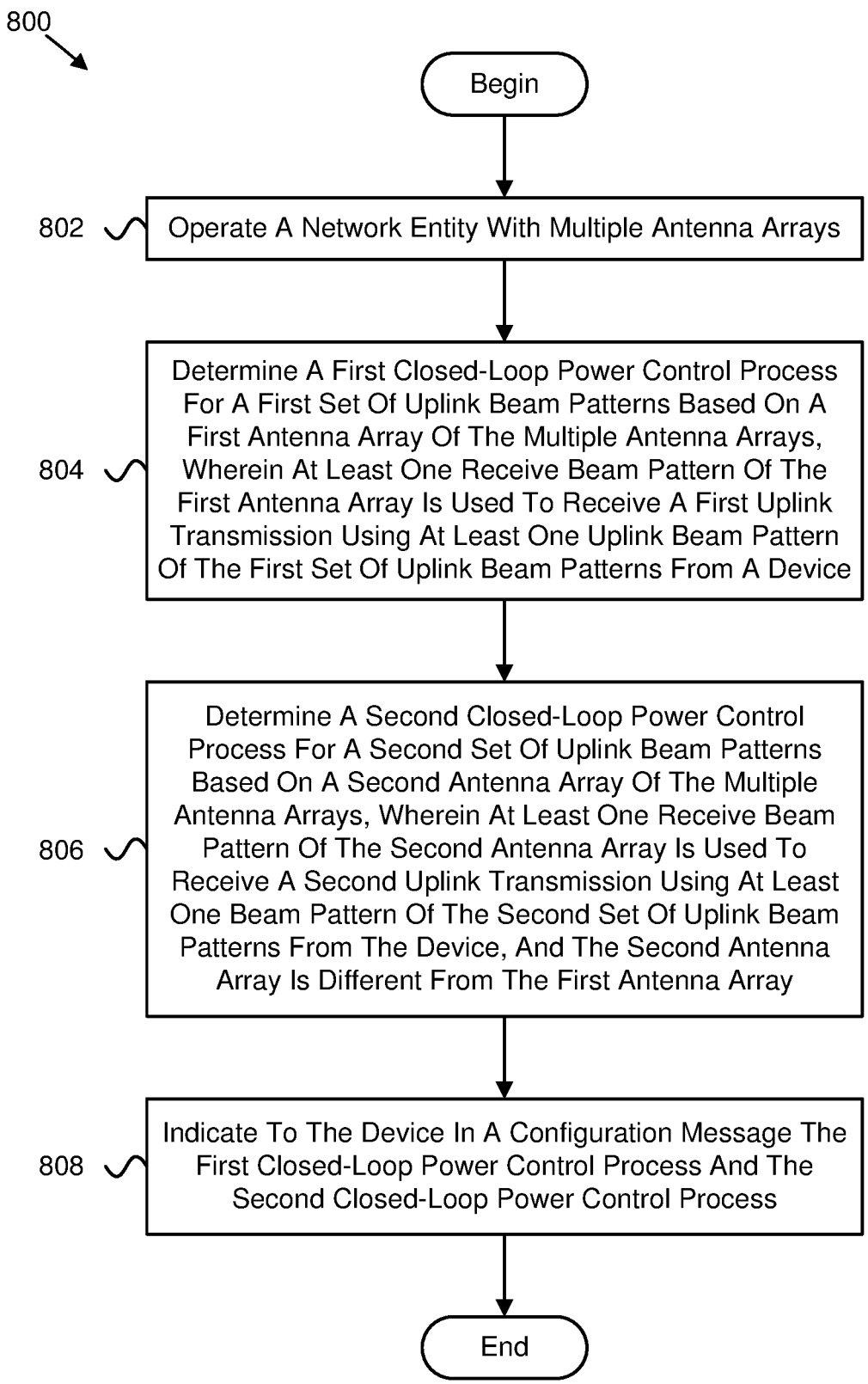
FIG. 8 is a flow chart diagram illustrating a further embodiment of a method for transmit power control.

FIG. 8 is a flow chart diagram illustrating a further embodiment of a method 800 for transmit power control. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

The method 800 may include operating 802 a network entity with multiple antenna arrays. In certain embodiments, the method 800 includes determining 804 a first closed-loop power control process for a first set of uplink beam patterns based on a first antenna array of the multiple antenna arrays. In such embodiments, at least one receive beam pattern of the first antenna array is used to receive a first uplink transmission using at least one uplink beam pattern of the first set of uplink beam patterns from a device. In some embodiments, the method 800 includes determining 806 a second closed-loop power control process for a second set of uplink beam patterns based on a second antenna array of the multiple antenna arrays. In such embodiments, at least one receive beam pattern of the second antenna array is used to receive a second uplink transmission using at least one beam pattern of the second set of uplink beam patterns from the device, and the second antenna array is different from the first antenna array. In various embodiments, the method 800 includes indicating 808 to the device in a configuration message the first closed-loop power control process and the second closed-loop power control process.

In certain embodiments, the first antenna array is oriented to a first spatial direction, the second antenna array is oriented to a second spatial direction, and the first spatial direction is different from the second spatial direction. In some embodiments, the method 800 comprises receiving, at the first antenna panel, a first uplink transmission using a first uplink beam pattern from the first set of uplink beam patterns, wherein a first transmit power control for the first uplink transmission is based on the first closed-loop power control process.

In various embodiments, the method 800 comprises receiving, at the first antenna panel, a second uplink transmission using a second uplink beam pattern from the first set of uplink beam patterns, wherein a second transmit power control for the second uplink transmission is based on the first closed-loop power control process. In one embodiment, the method 800 comprises transmitting, by the network entity to the device, a transmission power control command corresponding to the first closed-loop power control process for a first uplink transmission beam pattern.

Figure 9:
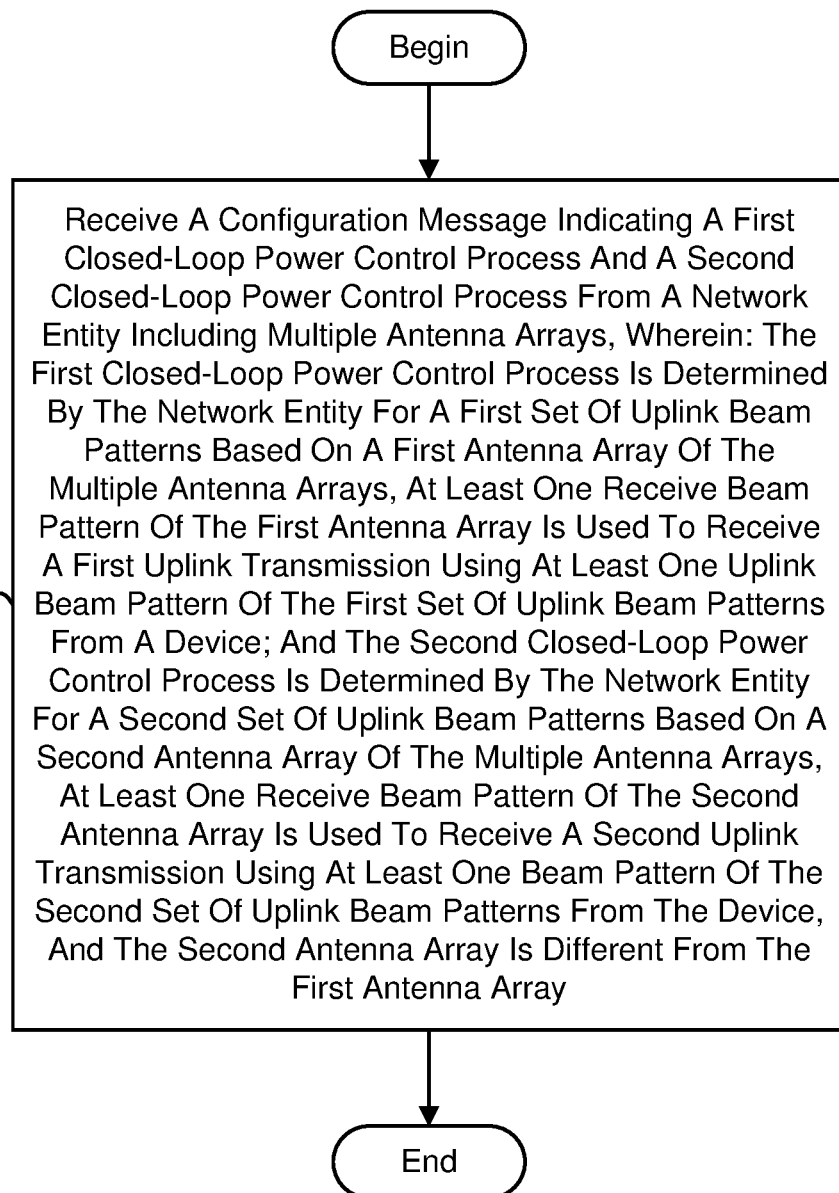
FIG. 9 is a flow chart diagram illustrating yet another embodiment of a method for transmit power control.

FIG. 9 is a flow chart diagram illustrating yet another embodiment of a method 900 for transmit power control. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include receiving 902 a configuration message indicating a first closed-loop power control process and a second closed-loop power control process from a network entity including multiple antenna arrays. In such an embodiment: the first closed-loop power control process is determined by the network entity for a first set of uplink beam patterns based on a first antenna array of the multiple antenna arrays, at least one receive beam pattern of the first antenna array is used to receive a first uplink transmission using at least one uplink beam pattern of the first set of uplink beam patterns from a device; and the second closed-loop power control process is determined by the network entity for a second set of uplink beam patterns based on a second antenna array of the multiple antenna arrays, at least one receive beam pattern of the second antenna array is used to receive a second uplink transmission using at least one beam pattern of the second set of uplink beam patterns from the device, and the second antenna array is different from the first antenna array.

In certain embodiments, the first antenna array is oriented to a first spatial direction, the second antenna array is oriented to a second spatial direction, and the first spatial direction is different from the second spatial direction. In some embodiments, the method 900 comprises transmitting a first uplink transmission using a first uplink beam pattern from the first set of uplink beam patterns, wherein a first transmit power control for the first uplink transmission is based on the first closed-loop power control process.

In various embodiments, the method 900 comprises transmitting a second uplink transmission using a second uplink beam pattern from the first set of uplink beam patterns, wherein a second transmit power control for the second uplink transmission is based on the first closed-loop power control process. In one embodiment, the method 900 comprises receiving, from the network entity, a transmission power control command corresponding to the first closed-loop power control process for a first uplink transmission beam pattern.

Figure 10:
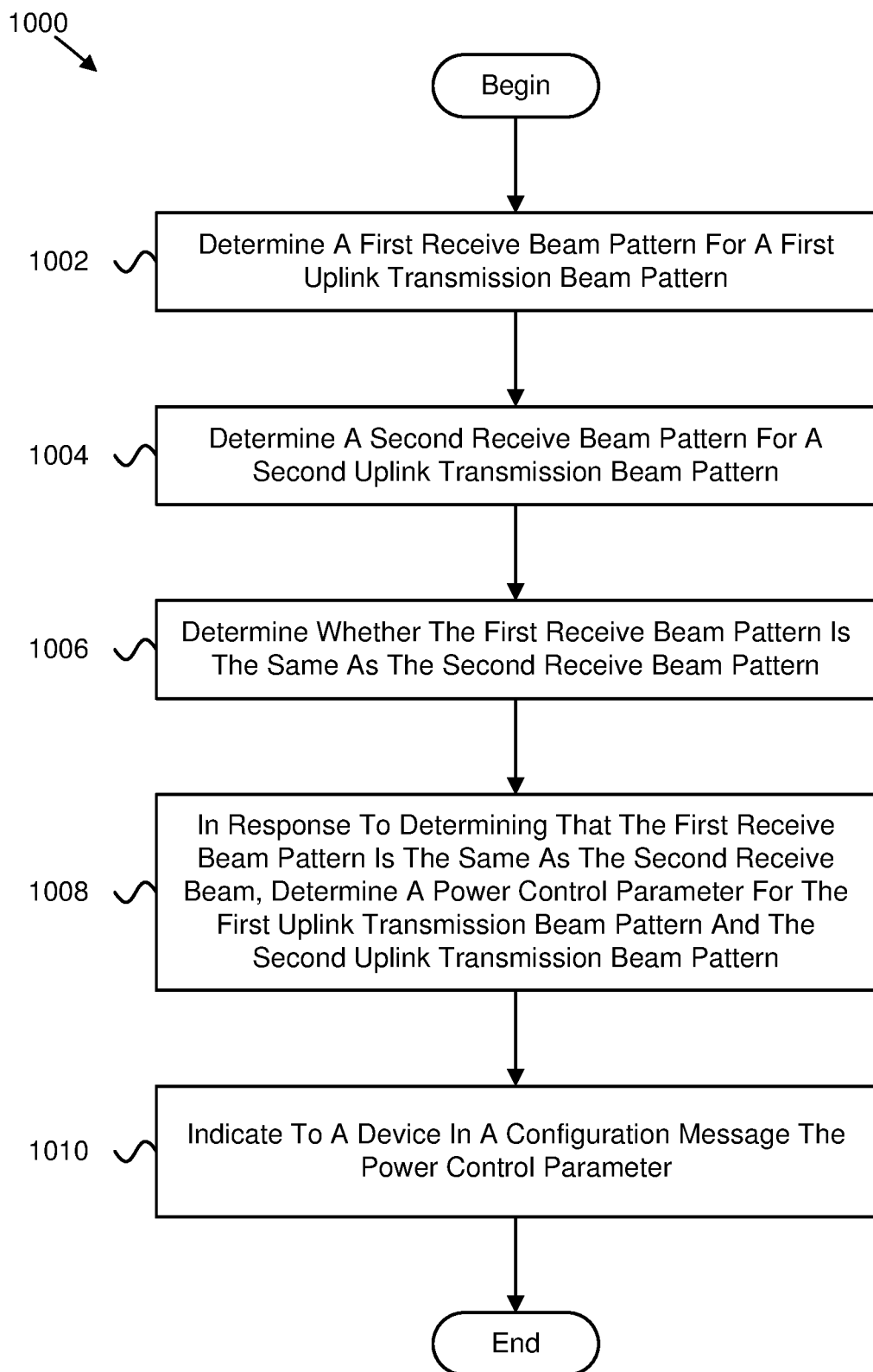
FIG. 10 is a flow chart diagram illustrating an additional embodiment of a method for transmit power control.

FIG. 10 is a flow chart diagram illustrating an additional embodiment of a method 1000 for transmit power control. In some embodiments, the method 1000 is performed by an apparatus, such as the network unit 104. In certain embodiments, the method 1000 may be performed by a processor executing program code, for example, a microcontroller, a microprocessor, a CPU, a GPU, an auxiliary processing unit, a FPGA, or the like.

The method 1000 may include determining 1002 a first receive beam pattern for a first uplink transmission beam pattern. In certain embodiments, the method 1000 includes determining 1004 a second receive beam pattern for a second uplink transmission beam pattern. In some embodiments, the method 1000 includes determining 1006 whether the first receive beam pattern is the same as the second receive beam pattern. In various embodiments, the method 1000 includes, in response to determining that the first receive beam pattern is the same as the second receive beam, determining 1008 a power control parameter for the first uplink transmission beam pattern and the second uplink transmission beam pattern. In one embodiment, the method 1000 includes indicating 1010 to a device in a configuration message the power control parameter.

In certain embodiments, the power control parameter is an open-loop power control parameter set. In some embodiments, the power control parameter indicates a closed loop power control process. In various embodiments, the method 1000 comprises: determining that a pathloss change greater than a threshold occurs during a change in an uplink transmission beam pattern from the first uplink transmission beam pattern to the second uplink transmission beam pattern; and updating a physical resource block allocation for the second uplink transmission beam pattern based on the pathloss change and a power headroom report. In one embodiment, determining that the pathloss change greater than the threshold occurs is based on receiving the power headroom report comprising a power headroom based on the second uplink transmission beam pattern.

Figure 11:
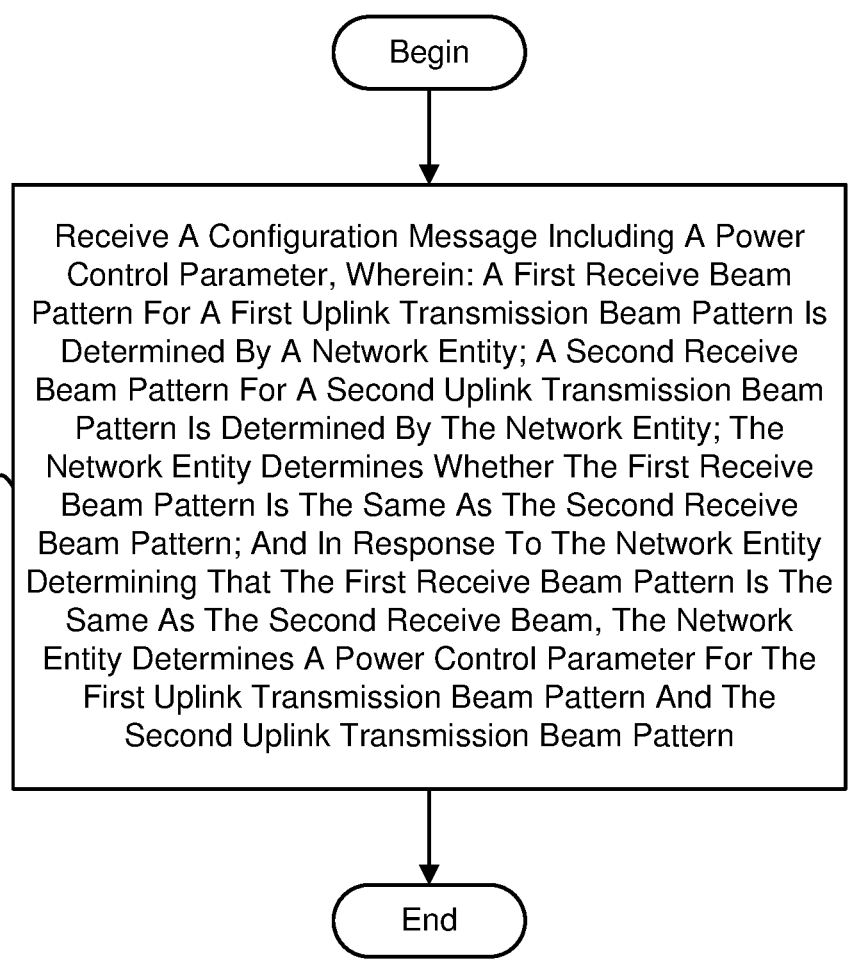
FIG. 11 is a flow chart diagram illustrating yet a further embodiment of a method for transmit power control.

FIG. 11 is a flow chart diagram illustrating yet a further embodiment of a method 1100 for transmit power control. In some embodiments, the method 1100 is performed by an apparatus, such as the remote unit 102. In certain embodiments, the method 1100 may be performed by a processor executing program code, for example, a microcontroller, a microprocessor, a CPU, a GPU, an auxiliary processing unit, a FPGA, or the like.

The method 1100 may include receiving 1102 a configuration message including a power control parameter. In such an embodiment: a first receive beam pattern for a first uplink transmission beam pattern is determined by a network entity; a second receive beam pattern for a second uplink transmission beam pattern is determined by the network entity; the network entity determines whether the first receive beam pattern is the same as the second receive beam pattern; and in response to the network entity determining that the first receive beam pattern is the same as the second receive beam, the network entity determines a power control parameter for the first uplink transmission beam pattern and the second uplink transmission beam pattern.

In certain embodiments, the power control parameter is an open-loop power control parameter set. In some embodiments, the power control parameter indicates a closed loop power control process. In various embodiments: the network entity determines that a pathloss change greater than a threshold occurs during a change in an uplink transmission beam pattern from the first uplink transmission beam pattern to the second uplink transmission beam pattern; and the network entity updates a physical resource block allocation for the second uplink transmission beam pattern based on the pathloss change and a power headroom report. In one embodiment, the network entity determines that the pathloss change greater than the threshold occurs is based on the network entity receiving the power headroom report comprising a power headroom based on the second uplink transmission beam pattern.

In one embodiment, a method comprises: receiving a first message that configures a set of reference signal resources, wherein each reference signal resource of the set of reference signal resources comprises a downlink reference signal resource or an uplink sounding reference signal resource, and each reference signal resource of the set of reference signal resources is associated with a corresponding uplink transmission beam pattern; receiving scheduling information for a first uplink transmission, wherein the first uplink transmission is associated with a first reference signal resource of the set of reference signal resources; determining a first uplink transmission beam pattern associated with the first reference signal resource; determining a first configured maximum output power for the first uplink transmission beam pattern, wherein the first configured maximum output power is based on a first antenna array property associated with the first uplink transmission beam pattern; determining a first transmit power for the first uplink transmission based on the first configured maximum output power; and performing the first uplink transmission using the first uplink transmission beam pattern based on the first transmit power.

In certain embodiments, the first reference signal resource spans a first set of frequency resources and a first set of orthogonal frequency division multiplexing symbols, and the set of reference signal resources comprises a second reference signal resource having a different number of orthogonal frequency division multiplexing symbols than the first reference signal resource.

In some embodiments, the first antenna array property comprises a first number of antenna elements, and determining the first configured maximum output power for the first uplink transmission beam pattern is based on the first number of antenna elements.

In various embodiments, the first number of antenna elements is for a first antenna array and the first uplink transmission beam pattern is associated with the first antenna array.

In one embodiment, the method comprises: receiving information of a second uplink transmission, wherein the first and second uplink transmissions overlap in time and are for a serving cell, and the second uplink transmission is associated with a second reference signal resource of the set of reference signal resources; determining a second uplink transmission beam pattern associated with the second reference signal resource, wherein the second uplink transmission beam pattern is different from the first uplink transmission beam pattern; determining a second configured maximum output power for the second uplink transmission beam pattern in the serving cell; determining a second transmit power for the second uplink transmission based on the second configured maximum output power; and performing the second uplink transmission using the second uplink transmission beam pattern based on the second transmit power; wherein the first reference signal resource is from a first subset of the set of reference signal resources, the second reference signal resource is from a second subset of the set of reference signal resources, and the first subset and the second subset are mutually exclusive.

In certain embodiments, the first subset is associated with a first set of similar beams and the second subset is associated with a second set of similar beams.

In some embodiments, the second configured maximum output power is the same as the first configured maximum output power, and the first uplink transmission beam pattern and the second uplink transmission beam pattern are from one antenna array.

In various embodiments, the first uplink transmission beam pattern is from a first antenna array with the first antenna array property, the second uplink transmission beam pattern is from a second antenna array with a second antenna array property, the second configured maximum output power is the same as the first configured maximum output power, and the first configured maximum output power is further based on the second antenna array property.

In one embodiment, the method comprises: determining a first intermediate configured maximum output power based on the first antenna array property, and a second intermediate configured maximum output power based on the second antenna array property; and determining the first configured maximum output power based on a selection from a group comprising: a minimum of the first intermediate configured maximum output power and the second intermediate configured maximum output power; a linear summation of the first intermediate configured maximum output power and the second intermediate configured maximum output power; and a maximum of the first intermediate configured maximum output power and the second configured intermediate maximum output power.

In certain embodiments, the method comprises power scaling the first uplink transmission, dropping the first uplink transmission, power scaling the second uplink transmission, dropping the second uplink transmission, or some combination thereof if a linear summation of the first transmit power and the second transmit power exceeds a total configured maximum output power $P_{CMAX,c}$ for the serving cell, wherein $P_{CMAX,c}$ depends on a power class and a $P_{EMAX,\ c}$ configured for the serving cell.

In some embodiments, the method comprises including a power headroom report in the first uplink transmission, wherein the power headroom report comprises a first power headroom for the first uplink transmission and the first configured maximum output power.

In various embodiments, the first power headroom is a difference between the first configured maximum output power and a power required for the first uplink transmission, and the power required for the first uplink transmission is dependent on a number of physical resource blocks indicated in the scheduling information for the first uplink transmission.

In one embodiment, the power headroom report corresponds to a first transmission time interval length associated with the first uplink transmission.

In certain embodiments, the method comprises including a second power headroom in the first uplink transmission, wherein the second power headroom comprises a virtual power headroom, the virtual power headroom is a difference between a second configured maximum output power for a second uplink transmission beam pattern and a power required for a reference format uplink transmission using the second uplink transmission beam pattern, the second uplink transmission beam pattern is associated with a second reference signal resource of the set of reference signal resources, and the second reference signal resource is different from the first reference signal resource.

In some embodiments, the first uplink transmission is based on a first number of physical resource blocks indicated in the scheduling information, and the reference format uplink transmission is based on a predefined number of physical resource blocks.

In various embodiments, the first power headroom and the second power headroom are included in the first uplink transmission in response to receiving an aperiodic trigger for reporting a virtual power headroom report.

In one embodiment, the method comprises reporting a first power headroom for the first uplink transmission and a second power headroom for the second uplink transmission.

In certain embodiments, the method comprises reporting a power headroom for the first uplink transmission and the second uplink transmission.

In some embodiments, the power headroom is based on a power required for the first uplink transmission and the first configured maximum output power.

In various embodiments, the power headroom is a difference between: an aggregate configured maximum output power; and a linear summation of a first power required for the first uplink transmission and a second power required for the second uplink transmission.

In one embodiment, the aggregate configured maximum output power is selected from a group comprising: a minimum of the first configured maximum output power and the second configured maximum output power; a linear summation of the first configured maximum output power and the second configured maximum output power; and a maximum of the first configured maximum output power and the second configured maximum output power.

In certain embodiments, the method comprises: determining a second uplink transmission beam pattern associated with a second reference signal resource, wherein the second reference signal resource is a predefined reference signal resource from the set of reference signal resources or an indicated reference signal resource from the set of reference signal resources, and the second reference signal resource is different from the first reference signal resource; determining a second configured maximum output power for the second uplink transmission beam pattern and a reference format uplink transmission, wherein the second configured maximum output power is based on a second antenna property associated with the second uplink transmission beam pattern, and the reference format uplink transmission is based on a predefined number of physical resource blocks; and including a power headroom in the first uplink transmission that is based on both the first uplink transmission and the second uplink transmission beam pattern; wherein the power headroom is a difference between: an aggregate configured maximum output power; and a linear summation of the power required for the first uplink transmission and a reference power required for the second uplink transmission beam pattern with respect to the reference format uplink transmission; and wherein the aggregate configured maximum output power is selected from a group comprising: a minimum of the first configured maximum output power and the second configured maximum output power; a linear summation of the first configured maximum output power and the second configured maximum output power; and a maximum of the first configured maximum output power and the second configured maximum output power.

In some embodiments, the first reference signal resource is a downlink reference signal resource and the method further comprises: measuring the downlink reference signal resource using a plurality of reception beam patterns; and determining the first uplink transmission beam pattern based on measurements resulting from measuring the downlink reference signal resource.

In various embodiments, the method comprises: receiving a second message adding a second reference signal resource to the set of reference signal resources, wherein the second reference signal resource is different from the first reference signal resource; determining a second uplink transmission beam pattern associated with the second reference signal resource; determining a second configured maximum output power for the second uplink transmission beam pattern and a reference format, wherein the second configured maximum output power is based on a second antenna property associated with the second uplink transmission beam pattern; triggering a power headroom report for the second reference signal resource; and reporting the power headroom report in the first uplink transmission, wherein the power headroom report comprises a virtual power headroom based on a reference format uplink transmission for the second uplink transmission beam pattern and an indication of the second reference signal resource.

In one embodiment, the method comprises: receiving a closed-loop transmission power control command in the scheduling information; determining a step size for the closed-loop transmission power control command based on an open-loop power control parameter set associated with the first downlink reference signal resource; and determining the first transmit power based on the first configured maximum output power, the closed-loop transmission power control command, and the step size.

In certain embodiments, the step size is determined based on a transmission time interval length corresponding to the first uplink transmission.

In some embodiments, the scheduling information comprises a transmission indicator that indicates that the uplink transmission is associated with the first reference signal resource.

In one embodiment, an apparatus comprises: a receiver that: receives a first message that configures a set of reference signal resources, wherein each reference signal resource of the set of reference signal resources comprises a downlink reference signal resource or an uplink sounding reference signal resource, and each reference signal resource of the set of reference signal resources is associated with a corresponding uplink transmission beam pattern; and receives scheduling information for a first uplink transmission, wherein the first uplink transmission is associated with a first reference signal resource of the set of reference signal resources; and a processor that: determines a first uplink transmission beam pattern associated with the first reference signal resource; determines a first configured maximum output power for the first uplink transmission beam pattern, wherein the first configured maximum output power is based on a first antenna array property associated with the first uplink transmission beam pattern; determines a first transmit power for the first uplink transmission based on the first configured maximum output power; and performs the first uplink transmission using the first uplink transmission beam pattern based on the first transmit power.

In certain embodiments, the first reference signal resource spans a first set of frequency resources and a first set of orthogonal frequency division multiplexing symbols, and the set of reference signal resources comprises a second reference signal resource having a different number of orthogonal frequency division multiplexing symbols than the first reference signal resource.

In some embodiments, the first antenna array property comprises a first number of antenna elements, and the processor determines the first configured maximum output power for the first uplink transmission beam pattern based on the first number of antenna elements.

In various embodiments, the first number of antenna elements is for a first antenna array and the first uplink transmission beam pattern is associated with the first antenna array.

In one embodiment, the receiver receives information of a second uplink transmission, wherein the first and second uplink transmissions overlap in time and are for a serving cell, and the second uplink transmission is associated with a second reference signal resource of the set of reference signal resources; and the processor: determines a second uplink transmission beam pattern associated with the second reference signal resource, wherein the second uplink transmission beam pattern is different from the first uplink transmission beam pattern; determines a second configured maximum output power for the second uplink transmission beam pattern in the serving cell; determines a second transmit power for the second uplink transmission based on the second configured maximum output power; and performs the second uplink transmission using the second uplink transmission beam pattern based on the second transmit power; wherein the first reference signal resource is from a first subset of the set of reference signal resources, the second reference signal resource is from a second subset of the set of reference signal resources, and the first subset and the second subset are mutually exclusive.

In certain embodiments, the first subset is associated with a first set of similar beams and the second subset is associated with a second set of similar beams.

In some embodiments, the second configured maximum output power is the same as the first configured maximum output power, and the first uplink transmission beam pattern and the second uplink transmission beam pattern are from one antenna array.

In various embodiments, the first uplink transmission beam pattern is from a first antenna array with the first antenna array property, the second uplink transmission beam pattern is from a second antenna array with a second antenna array property, the second configured maximum output power is the same as the first configured maximum output power, and the first configured maximum output power is further based on the second antenna array property.

In one embodiment, the processor: determines a first intermediate configured maximum output power based on the first antenna array property, and a second intermediate configured maximum output power based on the second antenna array property; and determines the first configured maximum output power based on a selection from a group comprising: a minimum of the first intermediate configured maximum output power and the second intermediate configured maximum output power; a linear summation of the first intermediate configured maximum output power and the second intermediate configured maximum output power; and a maximum of the first intermediate configured maximum output power and the second configured intermediate maximum output power.

In certain embodiments, the processor performs power scaling the first uplink transmission, dropping the first uplink transmission, power scaling the second uplink transmission, dropping the second uplink transmission, or some combination thereof if a linear summation of the first transmit power and the second transmit power exceeds a total configured maximum output power $P_{CMAX,c}$ for the serving cell, and $P_{CMAX,c}$ depends on a power class and a $P_{EMAX, c}$ configured for the serving cell.

In some embodiments, the processor includes a power headroom report in the first uplink transmission, and the power headroom report comprises a first power headroom for the first uplink transmission and the first configured maximum output power.

In various embodiments, the first power headroom is a difference between the first configured maximum output power and a power required for the first uplink transmission, and the power required for the first uplink transmission is dependent on a number of physical resource blocks indicated in the scheduling information for the first uplink transmission.

In one embodiment, the power headroom report corresponds to a first transmission time interval length associated with the first uplink transmission.

In certain embodiments, the processor includes a second power headroom in the first uplink transmission, the second power headroom comprises a virtual power headroom, the virtual power headroom is a difference between a second configured maximum output power for a second uplink transmission beam pattern and a power required for a reference format uplink transmission using the second uplink transmission beam pattern, the second uplink transmission beam pattern is associated with a second reference signal resource of the set of reference signal resources, and the second reference signal resource is different from the first reference signal resource.

In some embodiments, the first uplink transmission is based on a first number of physical resource blocks indicated in the scheduling information, and the reference format uplink transmission is based on a predefined number of physical resource blocks.

In various embodiments, the first power headroom and the second power headroom are included in the first uplink transmission in response to receiving an aperiodic trigger for reporting a virtual power headroom report.

In one embodiment, the processor reports a first power headroom for the first uplink transmission and a second power headroom for the second uplink transmission.

In certain embodiments, the processor reports a power headroom for the first uplink transmission and the second uplink transmission.

In some embodiments, the power headroom is based on a power required for the first uplink transmission and the first configured maximum output power.

In various embodiments, the power headroom is a difference between: an aggregate configured maximum output power; and a linear summation of a first power required for the first uplink transmission and a second power required for the second uplink transmission.

In one embodiment, the aggregate configured maximum output power is selected from a group comprising: a minimum of the first configured maximum output power and the second configured maximum output power; a linear summation of the first configured maximum output power and the second configured maximum output power; and a maximum of the first configured maximum output power and the second configured maximum output power.

In certain embodiments, the processor: determines a second uplink transmission beam pattern associated with a second reference signal resource, wherein the second reference signal resource is a predefined reference signal resource from the set of reference signal resources or an indicated reference signal resource from the set of reference signal resources, and the second reference signal resource is different from the first reference signal resource; determines a second configured maximum output power for the second uplink transmission beam pattern and a reference format uplink transmission, wherein the second configured maximum output power is based on a second antenna property associated with the second uplink transmission beam pattern, and the reference format uplink transmission is based on a predefined number of physical resource blocks; and includes a power headroom in the first uplink transmission that is based on both the first uplink transmission and the second uplink transmission beam pattern; wherein the power headroom is a difference between: an aggregate configured maximum output power; and a linear summation of the power required for the first uplink transmission and a reference power required for the second uplink transmission beam pattern with respect to the reference format uplink transmission; and wherein the aggregate configured maximum output power is selected from a group comprising: a minimum of the first configured maximum output power and the second configured maximum output power; a linear summation of the first configured maximum output power and the second configured maximum output power; and a maximum of the first configured maximum output power and the second configured maximum output power.

In some embodiments, the first reference signal resource is a downlink reference signal resource and the method further comprises: measuring the downlink reference signal resource using a plurality of reception beam patterns; and determining the first uplink transmission beam pattern based on measurements resulting from measuring the downlink reference signal resource.

In various embodiments, the processor: receives a second message adding a second reference signal resource to the set of reference signal resources, wherein the second reference signal resource is different from the first reference signal resource; determines a second uplink transmission beam pattern associated with the second reference signal resource; determines a second configured maximum output power for the second uplink transmission beam pattern and a reference format, wherein the second configured maximum output power is based on a second antenna property associated with the second uplink transmission beam pattern; triggers a power headroom report for the second reference signal resource; and reports the power headroom report in the first uplink transmission, wherein the power headroom report comprises a virtual power headroom based on a reference format uplink transmission for the second uplink transmission beam pattern and an indication of the second reference signal resource.

In one embodiment, the processor: receives a closed-loop transmission power control command in the scheduling information; determines a step size for the closed-loop transmission power control command based on an open-loop power control parameter set associated with the first downlink reference signal resource; and determines the first transmit power based on the first configured maximum output power, the closed-loop transmission power control command, and the step size.

In certain embodiments, the step size is determined based on a transmission time interval length corresponding to the first uplink transmission.

In some embodiments, the scheduling information comprises a transmission indicator that indicates that the uplink transmission is associated with the first reference signal resource.

In one embodiment, a method comprises: transmitting a first message that configures a set of reference signal resources, wherein each reference signal resource of the set of reference signal resources comprises a downlink reference signal resource or an uplink sounding reference signal resource, and each reference signal resource of the set of reference signal resources is associated with a corresponding uplink transmission beam pattern; transmitting scheduling information for a first uplink transmission, wherein the first uplink transmission is associated with a first reference signal resource of the set of reference signal resources, wherein: a first uplink transmission beam pattern associated with the first reference signal resource is determined by a device; a first configured maximum output power for the first uplink transmission beam pattern is determined by the device, and the first configured maximum output power is based on a first antenna array property associated with the first uplink transmission beam pattern; and a first transmit power for the first uplink transmission is determined by the device based on the first configured maximum output power; and receiving the first uplink transmission using the first uplink transmission beam pattern based on the first transmit power.

In certain embodiments, the first reference signal resource spans a first set of frequency resources and a first set of orthogonal frequency division multiplexing symbols, and the set of reference signal resources comprises a second reference signal resource having a different number of orthogonal frequency division multiplexing symbols than the first reference signal resource.

In some embodiments, the first antenna array property comprises a first number of antenna elements, and determining the first configured maximum output power for the first uplink transmission beam pattern is based on the first number of antenna elements.

In various embodiments, the first number of antenna elements is for a first antenna array and the first uplink transmission beam pattern is associated with the first antenna array.

In one embodiment, the method comprises: transmitting information of a second uplink transmission, wherein the first and second uplink transmissions overlap in time and are for a serving cell, and the second uplink transmission is associated with a second reference signal resource of the set of reference signal resources, wherein: a second uplink transmission beam pattern associated with the second reference signal resource is determined by the device, and the second uplink transmission beam pattern is different from the first uplink transmission beam pattern; a second configured maximum output power for the second uplink transmission beam pattern in the serving cell is determined by the device; and a second transmit power for the second uplink transmission based on the second configured maximum output power is determined by the device; and receiving the second uplink transmission using the second uplink transmission beam pattern based on the second transmit power; wherein the first reference signal resource is from a first subset of the set of reference signal resources, the second reference signal resource is from a second subset of the set of reference signal resources, and the first subset and the second subset are mutually exclusive.

In certain embodiments, the first subset is associated with a first set of similar beams and the second subset is associated with a second set of similar beams.

In some embodiments, the second configured maximum output power is the same as the first configured maximum output power, and the first uplink transmission beam pattern and the second uplink transmission beam pattern are from one antenna array.

In various embodiments, the first uplink transmission beam pattern is from a first antenna array with the first antenna array property, the second uplink transmission beam pattern is from a second antenna array with a second antenna array property, the second configured maximum output power is the same as the first configured maximum output power, and the first configured maximum output power is further based on the second antenna array property.

In one embodiment, a first intermediate configured maximum output power based on the first antenna array property is determined by the device, and a second intermediate configured maximum output power based on the second antenna array property is determined by the device; and the first configured maximum output power is determined based on a selection from a group comprising: a minimum of the first intermediate configured maximum output power and the second intermediate configured maximum output power; a linear summation of the first intermediate configured maximum output power and the second intermediate configured maximum output power; and a maximum of the first intermediate configured maximum output power and the second configured intermediate maximum output power.

In certain embodiments, the device power scales the first uplink transmission, drops the first uplink transmission, power scales the second uplink transmission, drops the second uplink transmission, or some combination thereof if a linear summation of the first transmit power and the second transmit power exceeds a total configured maximum output power $P_{CMAX,\,c}$ for the serving cell, and $P_{CMAX,c}$ depends on a power class and a $P_{EMAX,\,c}$ configured for the serving cell.

In some embodiments, a power headroom report is included in the first uplink transmission, and the power headroom report comprises a first power headroom for the first uplink transmission and the first configured maximum output power.

In various embodiments, the first power headroom is a difference between the first configured maximum output power and a power required for the first uplink transmission, and the power required for the first uplink transmission is dependent on a number of physical resource blocks indicated in the scheduling information for the first uplink transmission.

In one embodiment, the power headroom report corresponds to a first transmission time interval length associated with the first uplink transmission.

In certain embodiments, a second power headroom is included in the first uplink transmission, the second power headroom comprises a virtual power headroom, the virtual power headroom is a difference between a second configured maximum output power for a second uplink transmission beam pattern and a power required for a reference format uplink transmission using the second uplink transmission beam pattern, the second uplink transmission beam pattern is associated with a second reference signal resource of the set of reference signal resources, and the second reference signal resource is different from the first reference signal resource.

In some embodiments, the first uplink transmission is based on a first number of physical resource blocks indicated in the scheduling information, and the reference format uplink transmission is based on a predefined number of physical resource blocks.

In various embodiments, the first power headroom and the second power headroom are included in the first uplink transmission in response to receiving an aperiodic trigger for reporting a virtual power headroom report.

In one embodiment, the method comprises receiving a first power headroom for the first uplink transmission and a second power headroom for the second uplink transmission.

In certain embodiments, the method comprises receiving a power headroom for the first uplink transmission and the second uplink transmission.

In some embodiments, the power headroom is based on a power required for the first uplink transmission and the first configured maximum output power.

In various embodiments, the power headroom is a difference between: an aggregate configured maximum output power; and a linear summation of a first power required for the first uplink transmission and a second power required for the second uplink transmission.

In one embodiment, the aggregate configured maximum output power is selected from a group comprising: a minimum of the first configured maximum output power and the second configured maximum output power; a linear summation of the first configured maximum output power and the second configured maximum output power; and a maximum of the first configured maximum output power and the second configured maximum output power.

In certain embodiments, a second uplink transmission beam pattern associated with a second reference signal resource is determined by the device, the second reference signal resource is a predefined reference signal resource from the set of reference signal resources or an indicated reference signal resource from the set of reference signal resources, and the second reference signal resource is different from the first reference signal resource; a second configured maximum output power for the second uplink transmission beam pattern and a reference format uplink transmission is determined by the device, the second configured maximum output power is based on a second antenna property associated with the second uplink transmission beam pattern, and the reference format uplink transmission is based on a predefined number of physical resource blocks; and a power headroom is included in the first uplink transmission that is based on both the first uplink transmission and the second uplink transmission beam pattern; wherein the power headroom is a difference between: an aggregate configured maximum output power; and a linear summation of the power required for the first uplink transmission and a reference power required for the second uplink transmission beam pattern with respect to the reference format uplink transmission; and wherein the aggregate configured maximum output power is selected from a group comprising: a minimum of the first configured maximum output power and the second configured maximum output power; a linear summation of the first configured maximum output power and the second configured maximum output power; and a maximum of the first configured maximum output power and the second configured maximum output power.

In some embodiments, the first reference signal resource is a downlink reference signal resource and wherein: the downlink reference signal resource is measured using a plurality of reception beam patterns; and the first uplink transmission beam pattern is determined based on measurements resulting from measuring the downlink reference signal resource.

In various embodiments, the method comprises: transmitting a second message adding a second reference signal resource to the set of reference signal resources, wherein the second reference signal resource is different from the first reference signal resource, wherein: a second uplink transmission beam pattern associated with the second reference signal resource is determined by the device; a second configured maximum output power for the second uplink transmission beam pattern and a reference format is determined by the device, and the second configured maximum output power is based on a second antenna property associated with the second uplink transmission beam pattern; a power headroom report for the second reference signal resource is triggered by the device; and receiving the power headroom report in the first uplink transmission, wherein the power headroom report comprises a virtual power headroom based on a reference format uplink transmission for the second uplink transmission beam pattern and an indication of the second reference signal resource.

In one embodiment, the method comprises: transmitting a closed-loop transmission power control command in the scheduling information, wherein: a step size for the closed-loop transmission power control command is determined based on an open-loop power control parameter set associated with the first downlink reference signal resource; and the first transmit power is determined based on the first configured maximum output power, the closed-loop transmission power control command, and the step size.

In certain embodiments, the step size is determined based on a transmission time interval length corresponding to the first uplink transmission.

In some embodiments, the scheduling information comprises a transmission indicator that indicates that the uplink transmission is associated with the first reference signal resource.

In one embodiment, an apparatus comprises: a transmitter that: transmits a first message that configures a set of reference signal resources, wherein each reference signal resource of the set of reference signal resources comprises a downlink reference signal resource or an uplink sounding reference signal resource, and each reference signal resource of the set of reference signal resources is associated with a corresponding uplink transmission beam pattern; and transmits scheduling information for a first uplink transmission, wherein the first uplink transmission is associated with a first reference signal resource of the set of reference signal resources, wherein: a first uplink transmission beam pattern associated with the first reference signal resource is determined by a device; a first configured maximum output power for the first uplink transmission beam pattern is determined by the device, and the first configured maximum output power is based on a first antenna array property associated with the first uplink transmission beam pattern; and a first transmit power for the first uplink transmission is determined by the device based on the first configured maximum output power; and a receiver that receives the first uplink transmission using the first uplink transmission beam pattern based on the first transmit power.

In certain embodiments, the first reference signal resource spans a first set of frequency resources and a first set of orthogonal frequency division multiplexing symbols, and the set of reference signal resources comprises a second reference signal resource having a different number of orthogonal frequency division multiplexing symbols than the first reference signal resource.

In some embodiments, the first antenna array property comprises a first number of antenna elements, and determining the first configured maximum output power for the first uplink transmission beam pattern is based on the first number of antenna elements.

In various embodiments, the first number of antenna elements is for a first antenna array and the first uplink transmission beam pattern is associated with the first antenna array.

In one embodiment, the transmitter transmits information of a second uplink transmission, the first and second uplink transmissions overlap in time and are for a serving cell, and the second uplink transmission is associated with a second reference signal resource of the set of reference signal resources, wherein: a second uplink transmission beam pattern associated with the second reference signal resource is determined by the device, and the second uplink transmission beam pattern is different from the first uplink transmission beam pattern; a second configured maximum output power for the second uplink transmission beam pattern in the serving cell is determined by the device; and a second transmit power for the second uplink transmission based on the second configured maximum output power is determined by the device; and the receiver receives the second uplink transmission using the second uplink transmission beam pattern based on the second transmit power; and wherein the first reference signal resource is from a first subset of the set of reference signal resources, the second reference signal resource is from a second subset of the set of reference signal resources, and the first subset and the second subset are mutually exclusive.

In certain embodiments, the first subset is associated with a first set of similar beams and the second subset is associated with a second set of similar beams.

In some embodiments, the second configured maximum output power is the same as the first configured maximum output power, and the first uplink transmission beam pattern and the second uplink transmission beam pattern are from one antenna array.

In various embodiments, the first uplink transmission beam pattern is from a first antenna array with the first antenna array property, the second uplink transmission beam pattern is from a second antenna array with a second antenna array property, the second configured maximum output power is the same as the first configured maximum output power, and the first configured maximum output power is further based on the second antenna array property.

In one embodiment, a first intermediate configured maximum output power based on the first antenna array property is determined by the device, and a second intermediate configured maximum output power based on the second antenna array property is determined by the device; and the first configured maximum output power is determined based on a selection from a group comprising: a minimum of the first intermediate configured maximum output power and the second intermediate configured maximum output power; a linear summation of the first intermediate configured maximum output power and the second intermediate configured maximum output power; and a maximum of the first intermediate configured maximum output power and the second configured intermediate maximum output power.

In certain embodiments, the device power scales the first uplink transmission, drops the first uplink transmission, power scales the second uplink transmission, drops the second uplink transmission, or some combination thereof if a linear summation of the first transmit power and the second transmit power exceeds a total configured maximum output power $P_{CMAX,c}$ for the serving cell, and $P_{CMAX,c}$ depends on a power class and a $P_{EMAX,\,c}$ configured for the serving cell.

In some embodiments, a power headroom report is included in the first uplink transmission, and the power headroom report comprises a first power headroom for the first uplink transmission and the first configured maximum output power.

In various embodiments, the first power headroom is a difference between the first configured maximum output power and a power required for the first uplink transmission, and the power required for the first uplink transmission is dependent on a number of physical resource blocks indicated in the scheduling information for the first uplink transmission.

In one embodiment, the power headroom report corresponds to a first transmission time interval length associated with the first uplink transmission.

In certain embodiments, a second power headroom is included in the first uplink transmission, the second power headroom comprises a virtual power headroom, the virtual power headroom is a difference between a second configured maximum output power for a second uplink transmission beam pattern and a power required for a reference format uplink transmission using the second uplink transmission beam pattern, the second uplink transmission beam pattern is associated with a second reference signal resource of the set of reference signal resources, and the second reference signal resource is different from the first reference signal resource.

In some embodiments, the first uplink transmission is based on a first number of physical resource blocks indicated in the scheduling information, and the reference format uplink transmission is based on a predefined number of physical resource blocks.

In various embodiments, the first power headroom and the second power headroom are included in the first uplink transmission in response to receiving an aperiodic trigger for reporting a virtual power headroom report.

In one embodiment, the receiver receives a first power headroom for the first uplink transmission and a second power headroom for the second uplink transmission.

In certain embodiments, the receiver receives a power headroom for the first uplink transmission and the second uplink transmission.

In some embodiments, the power headroom is based on a power required for the first uplink transmission and the first configured maximum output power.

In various embodiments, the power headroom is a difference between: an aggregate configured maximum output power; and a linear summation of a first power required for the first uplink transmission and a second power required for the second uplink transmission.

In one embodiment, the aggregate configured maximum output power is selected from a group comprising: a minimum of the first configured maximum output power and the second configured maximum output power; a linear summation of the first configured maximum output power and the second configured maximum output power; and a maximum of the first configured maximum output power and the second configured maximum output power.

In certain embodiments, a second uplink transmission beam pattern associated with a second reference signal resource is determined by the device, the second reference signal resource is a predefined reference signal resource from the set of reference signal resources or an indicated reference signal resource from the set of reference signal resources, and the second reference signal resource is different from the first reference signal resource; a second configured maximum output power for the second uplink transmission beam pattern and a reference format uplink transmission is determined by the device, the second configured maximum output power is based on a second antenna property associated with the second uplink transmission beam pattern, and the reference format uplink transmission is based on a predefined number of physical resource blocks; and a power headroom is included in the first uplink transmission that is based on both the first uplink transmission and the second uplink transmission beam pattern; wherein the power headroom is a difference between: an aggregate configured maximum output power; and a linear summation of the power required for the first uplink transmission and a reference power required for the second uplink transmission beam pattern with respect to the reference format uplink transmission; and wherein the aggregate configured maximum output power is selected from a group comprising: a minimum of the first configured maximum output power and the second configured maximum output power; a linear summation of the first configured maximum output power and the second configured maximum output power; and a maximum of the first configured maximum output power and the second configured maximum output power.

In some embodiments, the first reference signal resource is a downlink reference signal resource, wherein: the downlink reference signal resource is measured using a plurality of reception beam patterns; and the first uplink transmission beam pattern is determined based on measurements resulting from measuring the downlink reference signal resource.

In various embodiments, the transmitter transmits a second message adding a second reference signal resource to the set of reference signal resources, wherein the second reference signal resource is different from the first reference signal resource, wherein: a second uplink transmission beam pattern associated with the second reference signal resource is determined by the device; a second configured maximum output power for the second uplink transmission beam pattern and a reference format is determined by the device, and the second configured maximum output power is based on a second antenna property associated with the second uplink transmission beam pattern; a power headroom report for the second reference signal resource is triggered by the device; and the receiver receives the power headroom report in the first uplink transmission, wherein the power headroom report comprises a virtual power headroom based on a reference format uplink transmission for the second uplink transmission beam pattern and an indication of the second reference signal resource.

In one embodiment, the transmitter transmits a closed-loop transmission power control command in the scheduling information, wherein: a step size for the closed-loop transmission power control command is determined based on an open-loop power control parameter set associated with the first downlink reference signal resource; and the first transmit power is determined based on the first configured maximum output power, the closed-loop transmission power control command, and the step size.

In certain embodiments, the step size is determined based on a transmission time interval length corresponding to the first uplink transmission.

In some embodiments, the scheduling information comprises a transmission indicator that indicates that the uplink transmission is associated with the first reference signal resource.

In one embodiment, a method comprises: operating a network entity with a plurality of antenna arrays; determining a first closed-loop power control process for a first set of uplink beam patterns based on a first antenna array of the plurality of antenna arrays, wherein at least one receive beam pattern of the first antenna array is used to receive a first uplink transmission using at least one uplink beam pattern of the first set of uplink beam patterns from a device; determining a second closed-loop power control process for a second set of uplink beam patterns based on a second antenna array of the plurality of antenna arrays, wherein at least one receive beam pattern of the second antenna array is used to receive a second uplink transmission using at least one beam pattern of the second set of uplink beam patterns from the device, and the second antenna array is different from the first antenna array; and indicating to the device in a configuration message the first closed-loop power control process and the second closed-loop power control process.

In certain embodiments, the first antenna array is oriented to a first spatial direction, the second antenna array is oriented to a second spatial direction, and the first spatial direction is different from the second spatial direction.

In some embodiments, the method comprises receiving, at the first antenna panel, a first uplink transmission using a first uplink beam pattern from the first set of uplink beam patterns, wherein a first transmit power control for the first uplink transmission is based on the first closed-loop power control process.

In various embodiments, the method comprises receiving, at the first antenna panel, a second uplink transmission using a second uplink beam pattern from the first set of uplink beam patterns, wherein a second transmit power control for the second uplink transmission is based on the first closed-loop power control process.

In one embodiment, the method comprises transmitting, by the network entity to the device, a transmission power control command corresponding to the first closed-loop power control process for a first uplink transmission beam pattern.

In one embodiment, an apparatus comprises: a processor that: operates a network entity with a plurality of antenna arrays; determines a first closed-loop power control process for a first set of uplink beam patterns based on a first antenna array of the plurality of antenna arrays, wherein at least one receive beam pattern of the first antenna array is used to receive a first uplink transmission using at least one uplink beam pattern of the first set of uplink beam patterns from a device; determines a second closed-loop power control process for a second set of uplink beam patterns based on a second antenna array of the plurality of antenna arrays, wherein at least one receive beam pattern of the second antenna array is used to receive a second uplink transmission using at least one beam pattern of the second set of uplink beam patterns from the device, and the second antenna array is different from the first antenna array; and indicates to the device in a configuration message the first closed-loop power control process and the second closed-loop power control process.

In certain embodiments, the first antenna array is oriented to a first spatial direction, the second antenna array is oriented to a second spatial direction, and the first spatial direction is different from the second spatial direction.

In some embodiments, the apparatus comprises a receiver that receives, at the first antenna panel, a first uplink transmission using a first uplink beam pattern from the first set of uplink beam patterns, wherein a first transmit power control for the first uplink transmission is based on the first closed-loop power control process.

In various embodiments, the receiver receives, at the first antenna panel, a second uplink transmission using a second uplink beam pattern from the first set of uplink beam patterns, wherein a second transmit power control for the second uplink transmission is based on the first closed-loop power control process.

In one embodiment, the apparatus comprises a transmitter that transmits, to the device, a transmission power control command corresponding to the first closed-loop power control process for a first uplink transmission beam pattern.

In one embodiment, a method comprises: receiving a configuration message indicating a first closed-loop power control process and a second closed-loop power control process from a network entity comprising a plurality of antenna arrays, wherein: the first closed-loop power control process is determined by the network entity for a first set of uplink beam patterns based on a first antenna array of the plurality of antenna arrays, at least one receive beam pattern of the first antenna array is used to receive a first uplink transmission using at least one uplink beam pattern of the first set of uplink beam patterns from a device; and the second closed-loop power control process is determined by the network entity for a second set of uplink beam patterns based on a second antenna array of the plurality of antenna arrays, at least one receive beam pattern of the second antenna array is used to receive a second uplink transmission using at least one beam pattern of the second set of uplink beam patterns from the device, and the second antenna array is different from the first antenna array.

In certain embodiments, the first antenna array is oriented to a first spatial direction, the second antenna array is oriented to a second spatial direction, and the first spatial direction is different from the second spatial direction.

In some embodiments, the method comprises transmitting a first uplink transmission using a first uplink beam pattern from the first set of uplink beam patterns, wherein a first transmit power control for the first uplink transmission is based on the first closed-loop power control process.

In various embodiments, the method comprises transmitting a second uplink transmission using a second uplink beam pattern from the first set of uplink beam patterns, wherein a second transmit power control for the second uplink transmission is based on the first closed-loop power control process.

In one embodiment, the method comprises receiving, from the network entity, a transmission power control command corresponding to the first closed-loop power control process for a first uplink transmission beam pattern.

In one embodiment, an apparatus comprises: a receiver that: receives a configuration message indicating a first closed-loop power control process and a second closed-loop power control process from a network entity comprising a plurality of antenna arrays, wherein: the first closed-loop power control process is determined by the network entity for a first set of uplink beam patterns based on a first antenna array of the plurality of antenna arrays, wherein at least one receive beam pattern of the first antenna array is used to receive a first uplink transmission using at least one uplink beam pattern of the first set of uplink beam patterns from a device; and the second closed-loop power control process is determined by the network entity for a second set of uplink beam patterns based on a second antenna array of the plurality of antenna arrays, wherein at least one receive beam pattern of the second antenna array is used to receive a second uplink transmission using at least one beam pattern of the second set of uplink beam patterns from the device, and the second antenna array is different from the first antenna array.

In certain embodiments, the first antenna array is oriented to a first spatial direction, the second antenna array is oriented to a second spatial direction, and the first spatial direction is different from the second spatial direction.

In some embodiments, the apparatus comprises a transmitter that transmits a first uplink transmission using a first uplink beam pattern from the first set of uplink beam patterns, wherein a first transmit power control for the first uplink transmission is based on the first closed-loop power control process.

In various embodiments, the transmitter transmits a second uplink transmission using a second uplink beam pattern from the first set of uplink beam patterns, and a second transmit power control for the second uplink transmission is based on the first closed-loop power control process.

In one embodiment, the receiver receives, from the network entity, a transmission power control command corresponding to the first closed-loop power control process for a first uplink transmission beam pattern.

In one embodiment, a method comprises: determining a first receive beam pattern for a first uplink transmission beam pattern; determining a second receive beam pattern for a second uplink transmission beam pattern; determining whether the first receive beam pattern is the same as the second receive beam pattern; in response to determining that the first receive beam pattern is the same as the second receive beam, determining a power control parameter for the first uplink transmission beam pattern and the second uplink transmission beam pattern; and indicating to a device in a configuration message the power control parameter.

In certain embodiments, the power control parameter is an open-loop power control parameter set.

In some embodiments, the power control parameter indicates a closed loop power control process.

In various embodiments, the method comprises: determining that a pathloss change greater than a threshold occurs during a change in an uplink transmission beam pattern from the first uplink transmission beam pattern to the second uplink transmission beam pattern; and updating a physical resource block allocation for the second uplink transmission beam pattern based on the pathloss change and a power headroom report.

In one embodiment, determining that the pathloss change greater than the threshold occurs is based on receiving the power headroom report comprising a power headroom based on the second uplink transmission beam pattern.

In one embodiment, an apparatus comprises: a processor that: determines a first receive beam pattern for a first uplink transmission beam pattern; determines a second receive beam pattern for a second uplink transmission beam pattern; determines whether the first receive beam pattern is the same as the second receive beam pattern; in response to determining that the first receive beam pattern is the same as the second receive beam, determines a power control parameter for the first uplink transmission beam pattern and the second uplink transmission beam pattern; and indicates to a device in a configuration message the power control parameter.

In certain embodiments, the power control parameter is an open-loop power control parameter set.

In some embodiments, the power control parameter indicates a closed loop power control process.

In various embodiments, the processor: determines that a pathloss change greater than a threshold occurs during a change in an uplink transmission beam pattern from the first uplink transmission beam pattern to the second uplink transmission beam pattern; and updates a physical resource block allocation for the second uplink transmission beam pattern based on the pathloss change and a power headroom report.

In one embodiment, the processor determining that the pathloss change greater than the threshold occurs is based on a receiver receiving the power headroom report comprising a power headroom based on the second uplink transmission beam pattern.

In one embodiment, a method comprises: receiving a configuration message comprising a power control parameter, wherein: a first receive beam pattern for a first uplink transmission beam pattern is determined by a network entity; a second receive beam pattern for a second uplink transmission beam pattern is determined by the network entity; the network entity determines whether the first receive beam pattern is the same as the second receive beam pattern; and in response to the network entity determining that the first receive beam pattern is the same as the second receive beam, the network entity determines a power control parameter for the first uplink transmission beam pattern and the second uplink transmission beam pattern.

In certain embodiments, the power control parameter is an open-loop power control parameter set.

In some embodiments, the power control parameter indicates a closed loop power control process.

In various embodiments: the network entity determines that a pathloss change greater than a threshold occurs during a change in an uplink transmission beam pattern from the first uplink transmission beam pattern to the second uplink transmission beam pattern; and the network entity updates a physical resource block allocation for the second uplink transmission beam pattern based on the pathloss change and a power headroom report.

In one embodiment, the network entity determines that the pathloss change greater than the threshold occurs is based on the network entity receiving the power headroom report comprising a power headroom based on the second uplink transmission beam pattern.

In one embodiment, an apparatus comprises: a receiver that: receives a configuration message comprising a power control parameter, wherein: a first receive beam pattern for a first uplink transmission beam pattern is determined by a network entity; a second receive beam pattern for a second uplink transmission beam pattern is determined by the network entity; the network entity determines whether the first receive beam pattern is the same as the second receive beam pattern; and in response to the network entity determining that the first receive beam pattern is the same as the second receive beam, the network entity determines a power control parameter for the first uplink transmission beam pattern and the second uplink transmission beam pattern.

In certain embodiments, the power control parameter is an open-loop power control parameter set.

In some embodiments, the power control parameter indicates a closed loop power control process.

In various embodiments: the network entity determines that a pathloss change greater than a threshold occurs during a change in an uplink transmission beam pattern from the first uplink transmission beam pattern to the second uplink transmission beam pattern; and the network entity updates a physical resource block allocation for the second uplink transmission beam pattern based on the pathloss change and a power headroom report.

In one embodiment, the network entity determines that the pathloss change greater than the threshold occurs is based on the network entity receiving the power headroom report comprising a power headroom based on the second uplink transmission beam pattern.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
receiving scheduling information for a first uplink transmission;
determining a first transmit power for the first uplink transmission based on a first configured maximum output power, wherein the first configured maximum output power is determined based on a first antenna array property associated with the first uplink transmission; and
performing the first uplink transmission based on the determined first transmit power.

2. The method of claim 1, wherein the first antenna array property comprises a first number of antenna elements, and the first configured maximum output power for the first uplink transmission is determined based on the first number of antenna elements.

3. The method of claim 1, wherein the first antenna array property comprises a first antenna array orientation to a first spatial direction, and the first configured maximum output power for the first uplink transmission is determined based on the first antenna array orientation to the first spatial direction.

4. The method of claim 1, wherein the first uplink transmission is associated with a first reference signal resource and the first configured maximum output power is determined based on a first antenna array property associated with the first reference signal resource.

5. The method of claim 4, further comprising:
determining a first uplink transmission beam pattern associated with the first reference signal resource, wherein the first configured maximum output power is determined based on a first antenna array property associated with the first uplink transmission beam pattern.

6. The method of claim 4, further comprising:
receiving a first message that configures a set of reference signal resources, wherein each reference signal resource of the set of reference signal resources comprises a downlink reference signal resource or an uplink sounding reference signal resource, and the set of reference signal resources comprises the first reference signal resource.

7. The method of claim 1, further comprising:
receiving information of a second uplink transmission, wherein the first and second uplink transmissions overlap in time and are for a serving cell, the second uplink transmission is associated with a second reference signal resource, the first uplink transmission is associated with a first reference signal resource, and the first reference signal resource is different from the second reference signal resource;
determining the first transmit power for the first uplink transmission based on the associated first reference signal resource;
determining a second transmit power for the second uplink transmission based on the associated second reference signal resource; and
performing the second uplink transmission based on the determined second transmit power.

8. The method of claim 7, wherein the second transmit power for the second uplink transmission is based on a second configured maximum output power, wherein the second configured maximum output power is determined based on the associated second reference signal resource.

9. The method of claim 7, further comprises determining a first uplink transmission beam pattern associated with the first reference signal resource and a second uplink transmission beam pattern associated with the second reference signal resource, wherein the second uplink transmission beam pattern is different from the first uplink transmission beam pattern.

10. The method of claim 9, wherein the first uplink transmission beam pattern is from a first antenna array with the first antenna array property, the second uplink transmission beam pattern is from a second antenna array with a second antenna array property.

11. The method of claim 10, wherein the first configured maximum output power is further determined based on the second antenna array property.

12. The method of claim 9, wherein the first uplink transmission beam pattern and the second uplink transmission beam pattern are from one antenna array.

13. The method of claim 1, further comprising including a power headroom report in the first uplink transmission, wherein the power headroom report comprises a first power headroom for the first uplink transmission and the first configured maximum output power.

14. The method of claim 7, further comprising reporting a power headroom for the first uplink transmission and the second uplink transmission.

15. The method of claim 14, wherein the power headroom is a difference between:
an aggregate configured maximum output power; and
a linear summation of a first power required for the first uplink transmission and a second power required for the second uplink transmission, wherein the aggregate configured maximum output power is selected from a group comprising:
a minimum of the first configured maximum output power and a second configured maximum output power associated with the second uplink transmission;
a linear summation of the first configured maximum output power and the second configured maximum output power; and
a maximum of the first configured maximum output power and the second configured maximum output power.

16. The method of claim 7, further comprising:
receiving a configuration message comprising a first open-loop power control parameter set and a second open-loop power control parameter set, wherein:
the first open-loop power control parameter set comprises a first pathloss reference signal resource and a first closed-loop power control process, each associated with the first reference signal resource;

the second open-loop power control parameter set comprises a second pathloss reference signal resource and a second closed-loop power control process, each associated with the second reference signal resource;

the first open-loop power control parameter set is different from the second open-loop power control parameter set;

the first pathloss reference signal resource is different from the second pathloss reference signal resource; and the first closed-loop power control process is different than the second closed-loop power control process;

receiving a closed-loop transmission power control command for the first closed-loop power control process in the scheduling information; and determining the first transmit power based on the first configured maximum output power, the closed-loop transmission power control command, the first open-loop power control parameter set, and the first pathloss reference signal resource.

17. An apparatus comprising:

a receiver that receives scheduling information for a first uplink transmission; and a processor that:

determines a first transmit power for the first uplink transmission based on a first configured maximum output power, wherein the first configured maximum output power is determined based on a first antenna array property associated with the first uplink transmission; and performs the first uplink transmission based on the determined first transmit power.

18. The apparatus of claim 17, wherein:

the receiver receives information of a second uplink transmission, wherein the first and second uplink transmissions overlap in time and are for a serving cell, the second uplink transmission is associated with a second reference signal resource, the first uplink transmission is associated with a first reference signal resource, and the first reference signal resource is different from the second reference signal resource;

the processor determines the first transmit power for the first uplink transmission based on the associated first reference signal resource;

the processor determines a second transmit power for the second uplink transmission based on the associated second reference signal resource; and the processor performs the second uplink transmission based on the determined second transmit power.

19. The apparatus of claim 18, wherein:

the receiver receives a configuration message comprising a first open-loop power control parameter set and a second open-loop power control parameter set, wherein:

the first open-loop power control parameter set comprises a first pathloss reference signal resource and a first closed-loop power control process, each associated with the first reference signal resource;

the second open-loop power control parameter set comprises a second pathloss reference signal resource and a second closed-loop power control process, each associated with the second reference signal resource;

the first open-loop power control parameter set is different from the second open-loop power control parameter set;

the first pathloss reference signal resource is different from the second pathloss reference signal resource; and the first closed-loop power control process is different than the second closed-loop power control process;

the receiver receives a closed-loop transmission power control command for the first closed-loop power control process in the scheduling information; and the processor determines the first transmit power based on the first configured maximum output power, the closed-loop transmission power control command, the first open-loop power control parameter set, and the first pathloss reference signal resource.

* * * * *